(12) United States Patent
Yamamoto et al.

(10) Patent No.: US 6,857,593 B2
(45) Date of Patent: Feb. 22, 2005

(54) MAGNETIC TAPE CARTRIDGE

(75) Inventors: Hidetoshi Yamamoto, Kanagawa (JP); Kenji Ishikawa, Kanagawa (JP); Yusuke Ishihara, Kanagawa (JP); Naoki Okutsu, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 24 days.

(21) Appl. No.: 10/158,854

(22) Filed: Jun. 3, 2002

(65) Prior Publication Data
US 2002/0179764 A1 Dec. 5, 2002

(30) Foreign Application Priority Data

| Jun. 4, 2001 | (JP) | ........................................ 2001-168417 |
| Jun. 5, 2001 | (JP) | ........................................ 2001-169670 |
| Jun. 11, 2001 | (JP) | ........................................ 2001-174932 |
| Jun. 11, 2001 | (JP) | ........................................ 2001-175371 |
| Sep. 17, 2001 | (JP) | ........................................ 2001-281965 |

(51) Int. Cl.⁷ .............................................. G03B 23/02
(52) U.S. Cl. ..................................................... 242/348.2
(58) Field of Search ....................................... 242/348.2

(56) References Cited

FOREIGN PATENT DOCUMENTS

| EP | 0 924 702 A1 | 6/1999 |
| JP | 11-265560 | 9/1999 |

*Primary Examiner*—Kathy Matecki
*Assistant Examiner*—Evan Langdon
(74) *Attorney, Agent, or Firm*—Sughrue Mion, PLLC

(57) ABSTRACT

A magnetic tape cartridge includes an opening 1C through which a magnetic tape is drawn out, and a slide door 6 that slides along a sidewall 1D provided with the opening 1C to open and close the opening 1C. The opening 1C is provided in part of the sidewall 1D across a lower half 1A and an upper half 1B of the cartridge case 1. At least one of a lower half portion and an upper half portion of the sidewall is provided with a holding groove 1L that receives a front end portion 6A of the slide door 6 when the opening is closed. Therefore, the upper half 1B and the lower half 1A of the magnetic tape cartridge may be smoothly combined.

7 Claims, 20 Drawing Sheets

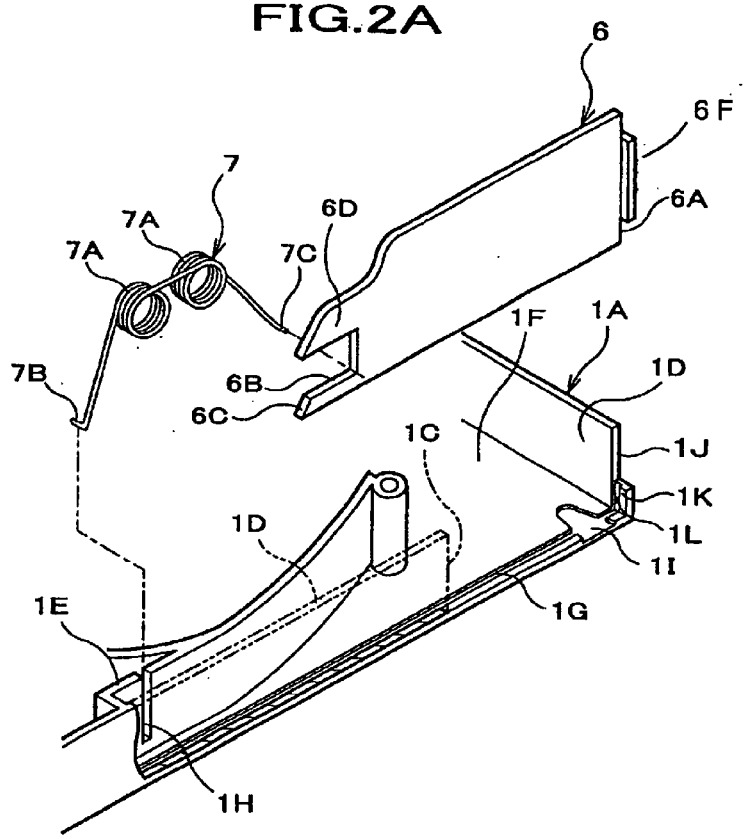
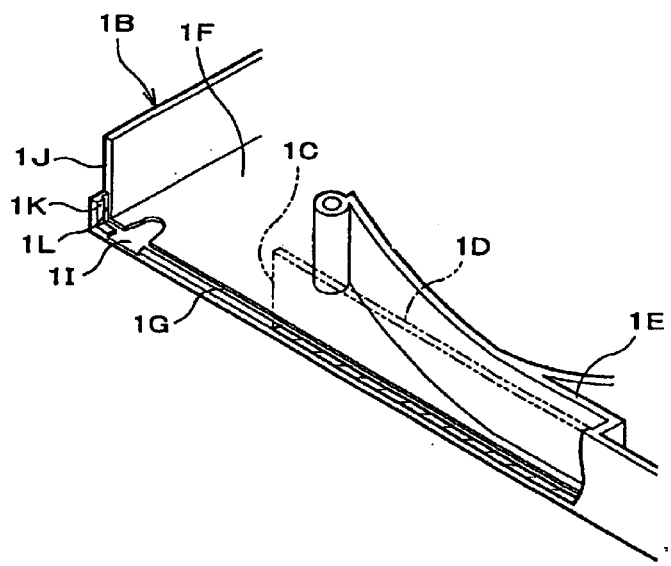

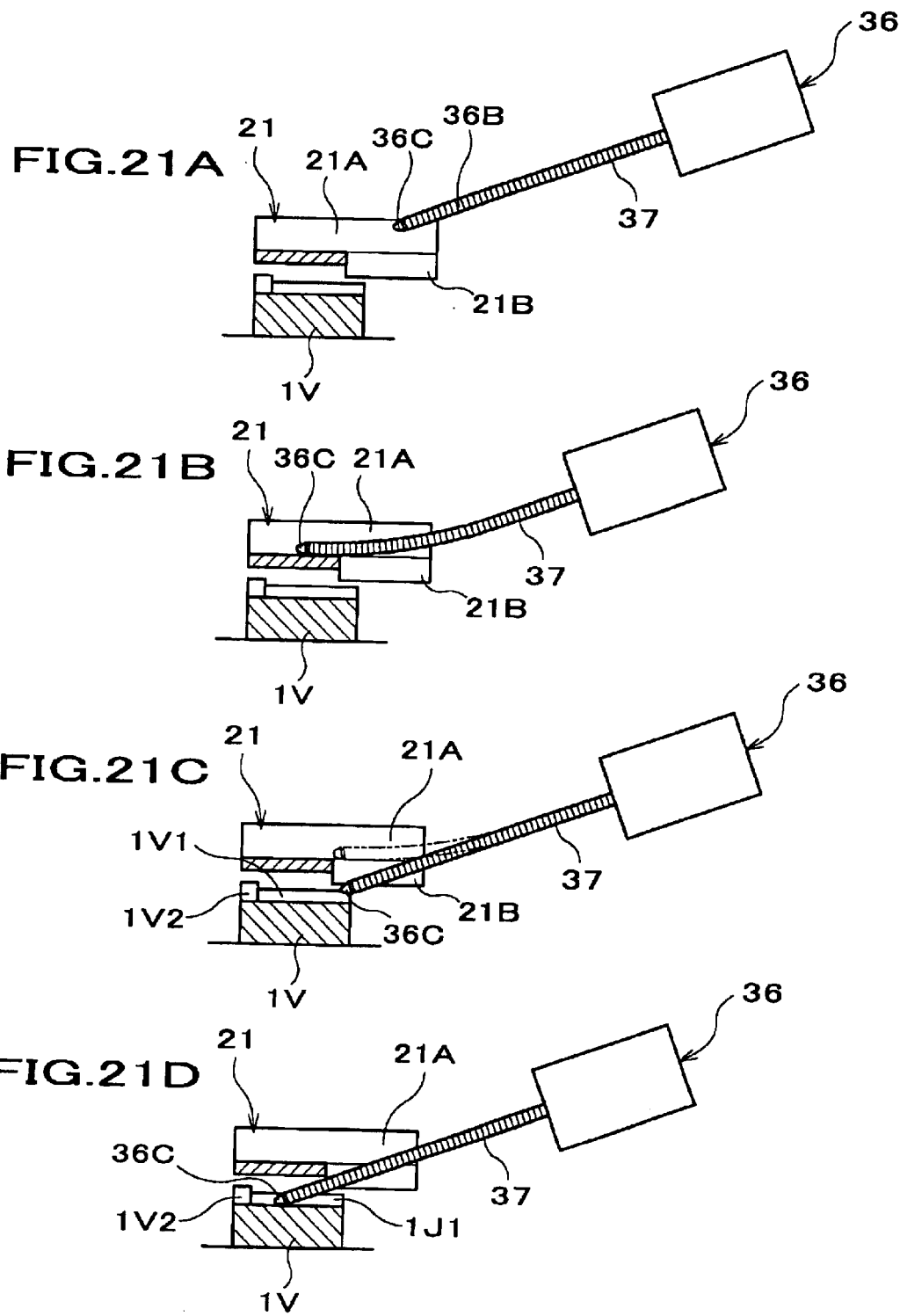

MAGNETIC TAPE CARTRIDGE

BACKGROUND OF THE INVENTION

This invention relates to magnetic tape cartridges, and more particularly to a magnetic tape cartridge that permits easy mounting of a slide door openably attached to an opening through which a magnetic tape may be drawn out.

LTO (Linear Tape Open) standard-compliant magnetic tape cartridges have prevailed in the realm of the magnetic tape cartridges used as an external recordable medium for data backup of a computer or the like. The magnetic tape cartridge of this type includes a single reel of magnetic tape and other components in a cartridge case comprised of a lower half and an upper half. At a side of the cartridge case, an opening through which the magnetic tape is drawn out is formed across the lower and upper halves. A slide door shaped like a thin plate for opening/closing the opening is slidably fitted in shallow guide grooves respectively formed in the lower and upper halves and kept in such a position as to close the opening under the stress of a spring member.

When the magnetic tape cartridge of this type is loaded in a drive that reads and writes data on the magnetic tape, a loading mechanism in the drive opens the slide door of the opening, and a single reel of magnetic tape is drawn out through the opening. The magnetic tape that is drawn out, then, runs across a head of the drive; thereby data is recorded on or read out of the magnetic tape. When the magnetic tape cartridge is unloaded from the drive, the slide door is moved by the action of the spring member to the position in which the slide door may close the opening in order to keep out dust.

In an assembly process of the above-described magnetic tape cartridge, a lower edge of the slide door is fitted in the shallow guide groove of the lower half of the cartridge case under the stress of the spring member toward a direction in which the slide door is closed. Thereafter, the upper half is combined with the lower half, and thus an upper edge of the slide door is fitted in the shallow guide groove of the upper half, so that the slide door as well as the spring member is mounted in the cartridge case.

A description will be given more specifically of exemplified mounting operations of the slide door in the conventional magnetic tape cartridge as described above with reference to FIGS. 23A-C and 24. Referring now to FIG. 23A, there is shown, as one example of the above slide door, a slide door A3 shaped like a laterally-oblong thin plate having upper and lower edges slidably fitted respectively into shallow guide grooves A2 of an upper half (not shown) and lower half A1 of the cartridge case. At a rear end (or side facing a direction in which the slide door A3 moves to open the opening) of the slide door A3 is formed a spring anchor portion A6 that anchors a distal end of a pressurizing spring arm A5 of a torsion coil spring A4 as the spring member. As shown in FIG. 23A, which is a magnified view of this example, the lower half A1 includes a sidewall A8 in which an opening A7 is made. The torsion coil spring A4 as the spring member, and the slide door A3 are fitted into the guide groove A2 formed along an inside of the opening A7 provided in the sidewall A8 of the lower half A1. In that event, the slide door A3 is mounted in the cartridge case in such a manner that the slide door A3 may be kept under the stress of the torsion coil spring A4 toward a direction in which the slide door A3 moves to close the opening, and that a front edge A9 thereof is in contact with a contact portion A11 provided in a sidewall A10 of the lower half A1 of the cartridge case, as shown in FIG. 23B, which is a cross-sectional view taken along line X—X in FIG. 23A.

Turning to FIG. 24, in contrast, there is shown, as another example of the above slide door, a slide door B4 shaped like a laterally-oblong thin plate having upper and lower edges slidably fitted respectively into shallow guide grooves B2 of an upper half (not shown) and a lower half B1 of the cartridge case. At a rear end (or side facing a direction in which the slide door B4 moves to open the opening) of the slide door B4 is provided a spring support rod B3 so as to project from a vertically middle position of the rear end toward rearward. At a distal end of the spring support rod B3 is formed a stopper head B5 having a slot that may reduce a diameter of the head. A thin-helix long compression coil spring B6 fitted in the spring support rod B3 of the slide door B4 with the diameter of the stopper head B5 at the distal end of the spring support rod B3 reduced is used for a spring member. The diameter of the fitted stopper head B5 expands by the action of elastic recovery, with the result that the compression coil spring B6 is secured so as not to come off; the compression coil spring B6 is wound around the spring support rod B3 in a manner that permits compressive deformation.

When the slide door B4 is fitted in the lower half B1 of the cartridge case as shown in FIG. 24, the slide door B4 is slightly tilted so that the spring support rod B3 declinates a little, and the distal end of the spring support rod B3 including the stopper head B5 is brought into contact with a support rod receiving groove B8 on a support rod receiving block B7 provided on the lower half B1 of the cartridge case, and is properly positioned. Next, the slide door B4 is slightly moved in a direction to open the opening (to the left in FIG. 24) so that the stopper head B5 may pass on a side of a spring receiving piece B9 along the support rod receiving groove B8. Thereafter, the slide door B4 is lowered toward the guide groove B2 in the lower half B1 while a horizontal orientation of the slide door B4 is being restored, and the lower edge thereof is fitted into the guide groove B2.

The example as shown in FIGS. 23A through 23C keeps the slide door A3 open upside until an upper half (not shown) is combined with the lower half A1. Moreover, the guide groove A2 that receives the slide door A3 is shallow. Accordingly, the slide door A3 tends to fall in a direction perpendicular to a face of the slide door A3, particularly, in a direction indicated by an arrow YA inward of the cartridge case as shown in FIG. 23C that is a section taken along line Y—Y in FIG. 23A. Falling of the slide door would make the slide door A3 difficult to neatly fit into the guide groove A2 in the lower half A1 or the guide groove in the upper half (not shown), in some instances.

On the other hand, the example as shown in FIG. 24 would have the spring support rod B3 deviated from a direction extending from the support rod receiving groove B8, or would have the spring support rod B3 curved, when the distal end of the spring support rod B3 projected from the slide door B4 is brought into contact with the support rod receiving groove B8 on the support rod receiving block B7 provided on the lower half B1, and is positioned. Consequently, The stopper head B5 on the distal end of the spring support rod B3 could not be properly positioned in the support rod receiving groove B8, so that the compression coil spring B6 wound around the spring support rod B3 would possibly fail to be hooked on the spring receiving piece B9.

In short, during an assembly process of the conventional magnetic tape cartridge, the slide door having a lower edge to be fitted in a shallow guide groove in a lower half of a cartridge case would likely fall when the lower edge is fitted into the shallow guide groove in the lower half, and a stress of the spring member would possibly lift up the end of the slide door at a side facing a direction in which the slide door moves to open the opening, so as to get off the guide groove. Moreover, the compression coil spring wound around the spring support rod of the slide door would fail to be securely hooked on the spring receiving piece. Therefore, when the slide door is mounted in the cartridge case while the lower half and upper half of the cartridge case are combined during the assembly process of the conventional magnetic tape cartridge, the lower edge of the slide door would not be neatly fitted into the guide groove in the lower half, or the upper edge of the slide door would not be neatly fitted into the guide groove in the upper half; thereby failure in mounting the slide door would likely occur. This tendency would not be negligible when the slide door is mounted using an assembly robot.

SUMMARY OF THE INVENTION

Therefore, it is a first exemplified object of the present invention to provide a magnetic tape cartridge that permits smooth combination of an upper half and lower half of a cartridge case. Moreover, it is a second exemplified object of the present invention to provide an assembly method of a magnetic tape cartridge in which a slide door may be securely mounted using an assembly robot. Further, it is a third exemplified object of the present invention to provide an assembly supportive device that can securely guide a distal end of a spring support rod for a slide door onto a support rod receiving block in a lower half of a cartridge case, so that the assembly operation of the slide door using the assembly robot may be securely performed.

In order to achieve the above first object, an magnetic tape cartridge according to one exemplified aspect of the present invention comprises an opening through which a magnetic tape is drawn out, the opening being provided in part of a sidewall of a cartridge case across a lower half and an upper half of the cartridge case; and a slide door that slides along the sidewall provided with the opening to open and close the opening. In this magnetic tape cartridge, at least one of a lower half portion and an upper half portion of the sidewall is provided with a holding concave portion that receives a front end portion of the slide door when the opening is closed.

When the magnetic tape cartridge according to the present invention is assembled, first, each component such as a reel and a safety lug is mounted respectively in a predetermined position of the lower half. Next, a spring member is mounted in the lower half, and thereafter the slide door is fitted into a guide groove in the lower half formed along the inside of the sidewall provided with the opening. At this stage, the slide door is constantly stressed by the action of the spring member toward a direction in which the slide door moves to close the opening, and the front end is kept in contact with an inner edge of the opening that is provided in the sidewall of the lower half to draw out a magnetic tape. According to the magnetic tape cartridge in this first aspect of the present invention, the sidewall includes the holding concave portion, and thus the front end of the slide door may be held in the holding concave portion when the opening is closed with the slide door. Therefore, the slide door is supported with the holding concave portion and prevented from falling in a direction perpendicular to the face of the slide door. Further, disadvantageous circumstances may be avoided in which the slide door could not be neatly fitted into the guide groove in the upper or lower half and thus the upper half could not be properly combined with the lower half.

In order to achieve the above second object, a method of assembling a magnetic tape cartridge according to a second exemplified aspect of the present invention comprises the steps of: providing an opening through which a magnetic tape is drawn out in part of a sidewall of a cartridge case across a lower half and an upper half of the cartridge case; mounting a slide door that opens and closes the opening between guide portions each provided in the lower half and the upper half, while stressing the slide door with a spring member toward a position in which the opening is closed. Further, in this method according to the second aspect of the present invention, the mounting step includes: mounting the slide door stressed with the spring member toward the position in which the opening is closed by fitting a lower edge of the slide door into the guide portion of the lower half; keeping a mounting position of the slide door by holding an end of the slide door facing a direction in which the slide door moves to close the opening with a chuck device; and combining the upper half with the lower half.

According to this method in the second aspect of the present invention, after the lower edge of the slide door is fitted into the guide portion of the lower half, the end of the slide door facing the direction in which the slide door moves to close the opening is held with the chuck device to keep a position of the slide door, and thus the slide door may be kept upright without tilting or falling. Consequently, the lower edge and upper edge of the slide door may be securely fitted respectively into each guide portion in the lower half and the upper half when the lower half and the upper half are combined.

In the above method of assembling a magnetic cartridge according to the second aspect of the present invention, the end of the slide door facing the direction in which the slide door moves to close the opening may preferably be anchored with a stopper after the upper half is combined with the lower half, and the stopper is removed from the slide door after the slide door is released from the chuck device. This allows the chuck device to be easily and smoothly detached from the front end of the slide door stressed toward the direction in which the slide door moves to close the opening.

Moreover, in the above method, each guide portion provided in the lower half and the upper half may be comprised of not only a guide groove, but also a rib provided between the slide door and upper and lower edges of the opening in the sidewall in such a manner as to slidably hold the slide door, or a plurality of projections, or the like.

In order to achieve the above second object, a method of assembling a magnetic tape cartridge according to a third exemplified aspect of the present invention comprises the steps of: providing an opening through which a magnetic tape is drawn out in part of a sidewall of a cartridge case across a lower half and an upper half of the cartridge case; mounting a slide door that opens and closes the opening between guide portions each provided in the lower half and the upper half, while stressing the slide door with a spring member toward a position in which the opening is closed. In this method according to the third aspect of the present invention, the above mounting step includes: mounting the slide door stressed with the spring member toward the position in which the opening is closed by fitting a lower edge of the slide door into the guide portion of the lower half; holding the slide door by pressing an appropriate spot of an end of the slide door facing a direction in which the slide door moves to close the opening so that the end of the slide door facing the direction in which the slide door moves to close the opening is prevented from rising out due to stress imposed by the spring member; and combining the upper half with the lower half.

According to this method in the third aspect of the present invention, after fitting the lower edge of the slide door into the guide portion of the lower half, the slide door is held by pressing an appropriate spot of the end of the slide door facing the direction in which the slide door moves to close the opening, and thus the slide door may be kept upright without tilting or falling. Consequently, the lower edge and upper edge of the slide door may be securely fitted respectively into each guide portion in the lower half and the upper half when the lower half and the upper half are combined.

In the above method of assembling a magnetic cartridge according to the third aspect of the present invention, the 'appropriate spot' for pressing the end of the slide door facing the direction in which the slide door moves to close the opening to hold the slide door is such a spot that may be pressed to effectively prevent the end of the slide door facing the direction in which the slide door moves to close the opening from rising out. The appropriate spot may be located above a straight line so extending as to join a contact point of one end of the spring member with the lower half and a contact point of the other end of the spring member with the slide door. Moreover, each guide portion provided in the lower half and the upper half may be comprised of not only a guide groove, but also a rib provided between the slide door and upper and lower edges of the opening in the sidewall in such a manner as to slidably hold the slide door, or a plurality of projections, or the like.

Further, in order to achieve the above third object, according to a fourth exemplified aspect of the present invention, there is provided an assembly supportive device which guides a distal end of a spring support rod onto a support rod receiving block provided on a lower half of a cartridge case when a slide door for opening/closing an opening through which a magnetic tape of a magnetic tape cartridge is drawn out is fitted in the lower half of the cartridge case, a proximal end of the spring support rod being projected from the slide door, around which spring support rod a compression coil spring is wound. The assembly supportive device according to the fourth aspect of the present invention comprises: a guide member having a V-shaped groove that receives the distal end of the spring support rod; and a positioning device capable of moving the guide member from a retraction position outside the lower half to a use position over the support rod receiving block on the lower half, and the guide member is formed with a slit so provided as to cut through a bottom of the V-shaped groove partway from one end.

According to this assembly supportive device in the fourth aspect of the present invention, the positioning device serves to move the guide member from the retraction position outside the lower half to the use position over the support rod receiving block on the lower half, to locate the guide member. In this operation, the slide door is held in such a slightly tilted posture that the spring support rod of the slide door may orient obliquely in a gently declining direction. The distal end of the spring support rod is then pushed into a dead end (the other end) of the V-shaped groove of the guide member, and moves back to the one end from which a slit is provided partway toward the other end. Through a series of these operations, the guide member guides the distal end of the spring support rod of the slide door through the slit formed at the bottom of the V-shaped groove onto the support rod receiving block of the lower half.

Other objects and further features of the present invention will become readily apparent from the following description of preferred embodiments with reference to accompanying drawings.

BRIEF DESCRIPTION OF THE DRAWINGS

FIG. 2A is a partially magnified perspective view of a lower half of a cartridge case, depicting a portion around the slide door as shown in FIG. 1.

FIG. 2B is a partially magnified perspective view of an upper half of the cartridge case, depicting a portion around the slide door as shown in FIG. 1.

FIGS. 21(A) through 21(D) are diagrams for illustrating a guide operation of the guide member in the assembly supportive device for the magnetic tape cartridge according to the fourth embodiment of the present invention, which guide member guides the spring support rod.

DETAILED DESCRIPTION OF THE PREFERRED EMBODIMENTS

Figure 1:
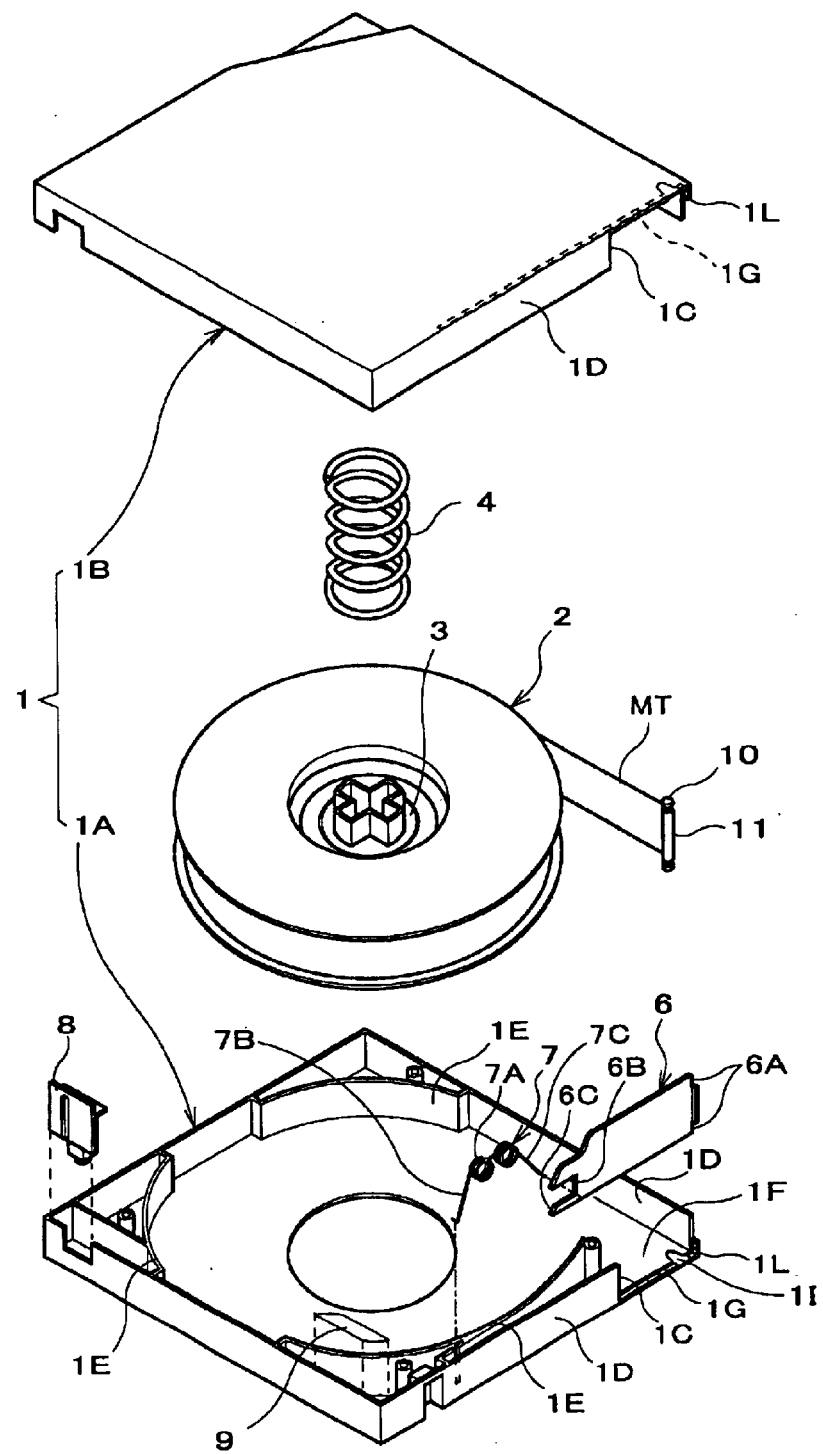
FIG. 1 is an exploded perspective view showing components of a magnetic tape cartridge according to a first embodiment of the present invention.

A description will be given of the preferred embodiments of the present invention with reference to the drawings. First, referring to FIGS. 1 through 6, one exemplified embodiment of a magnetic tape cartridge according to the present invention will be described. The magnetic tape cartridge is comprised of a lower half and an upper half, and an opening through which a magnetic tape is drawn out is provided in a sidewall portion of the cartridge case across the lower half and the upper half. At the sidewall of at least one of the lower half and the upper half is provided a holding concave portion that receives a front end portion of a slide door when the opening is closed. In the drawings, FIG. 1 is an exploded view, in perspective, of components of the magnetic tape cartridge according to a first embodiment of the present invention, and FIGS. 2A and 2B are partially magnified perspective views of some components, each depicting a portion around the slide door as shown in FIG. 1.

The magnetic tape cartridge according to the first embodiment of the present invention is a so-called LTO standard-compliant model of magnetic tape cartridges. As shown in FIG. 1, this model of magnetic tape cartridge typically includes a cartridge case 1 comprised of a lower half 1A and an upper half 1B, and included inside the cartridge case 1 are a single reel 2 around which magnetic tape MT is wound, a lock plate 3 and a compression coil spring 4 for locking rotation of the reel 2, a slide door 6, a spring member 7, a safety lug 8, a cartridge memory chip (IC chip) 9, and the like.

In part of one sidewall 1D of the cartridge case 1 near a corner of the cartridge case 1 is formed an opening 1C through which a magnetic tape MT is drawn out such that the opening 1C spreads across the lower half 1A and the upper half 1B. The opening 1C is configured to open and close as the slide door 6 slides along the sidewall 1D of the lower half 1A. The slide door 6 is configured to have a rear end thereof constantly stressed with a spring member 7 toward a position in which the opening is closed. The spring member 7 is a torsion coil spring having two coiled portions 7A, 7A.

On the end of the magnetic tape MT is clamped a leader pin 10 with a clip 11. The leader pin 10 may serve as a hook on which a tape loading mechanism of a recording/reading device (not shown) catches the end of the magnetic tape MT to be drawn out through the opening 1C.

The lower half 1A and the upper half 1B each constitute a half of the cartridge case 1, and thus are combined into the cartridge case 1. In the lower half 1A, a plurality of stiffening ribs 1E, ... are formed as appropriate in positions where the ribs do not interfere with the reel 2, to provide a structure that permits each component to be supported and mounted by making use of these ribs 1E, ....

As shown in FIG. 2A, on an inside bottom surface 1F of the lower half 1A, a shallow guide groove 1G having an approximately rectangular cross section extends along the one sidewall 1D in such a position as to adjoin a proximal bottom line of the sidewall 1D so that the slide door 6 may slide smoothly. In the rib 1E that stands upright on the opposite side of the guide groove 1G to the sidewall 1D, a spring hook portion 1H with which a fixable spring arm 7B at a rear end of the spring member 7 is hooked up to the lower half 1A is formed in a vertical slit. A holding portion 1I is engraved at the corner on the inner bottom surface of the lower half 1A to receive the leader pin 10 (see FIG. 1) when a magnetic tape is reeled up into the cartridge case 1.

The recording/reading device uses an arm 6F (shown in FIG. 2A) provided in the front end of the slide door 6 in order to open the slide door 6. A cutaway portion 1J through which the arm 6F enters is provided by cutting away two thirds or so from an upper end of a portion of the sidewall 1D with which the front edge 6A of the slide door 6 gets into contact. Due to the cutaway portion 1J, a contact spot 1K with which the front end of the slide door 6 is brought into contact when the slide door has closed the opening 1C appears to rise from the bottom surface 1F of the lower half 1A.

In the contact spot 1K, a receiving groove 1L having approximately rectangular cross section extends along the length of the contact spot 1K so as to receive the front edge 6A of the slide door 6 when the slide door 6 has closed the opening 1C.

Inside surfaces of the upper half 1B are, as shown in FIG. 2B, substantially symmetrical to the inside surfaces of the lower half 1A; a guide groove 1G that guides the upper edge of the slide door 6 is formed along the sidewall 1D inside the opening 1C, and a contact spot 1K with which the front edge (front end) 6A of the slide door 6 is brought into contact when the slide door 6 has closed the opening 1C is provided in the upper half 1B. In the contact spot 1K, as in the lower half 1A, a receiving groove 1L is provided so as to receive the front edge 6A of the slide door 6 when the slide door 6 has closed the opening 1C.

The spring member 7 is a torsion coil spring having two coiled portions 7A, 7A. When the spring member 7 is mounted in the lower half 1A, the fixable spring arm 7B at the rear end is hooked up to the spring hook portion 1H, and a pressure spring arm 7C at the front end is placed in the guide groove 1G; thereafter, the slide door 6 is fitted into the guide groove 1G while the pressure spring arm 7C is being pushed by the rear end of the slide door 6 and kept bent.

The slide door 6 is, as shown in FIG. 2A, generally shaped like a rectangular thin plate, and a rear end thereof is formed with a spring hook portion 6B at which the pressure spring arm 7C may be hooked up, by rectangularly cutting out a midsection between top and bottom. A lower end portion of the spring hook portion 6B is formed with a wedge portion 6C that has bottom and end surfaces making an acute angle so as to scoop up the pressure spring arm 7C of the spring member 7 when the slide door 6 is mounted in the lower half 1A with the spring member 7 being pushed and kept bent. In addition, An upper and rear end portion of the spring hook portion 6B is cut off and formed with a protrusion 6D that juts out to the rear end of the slide door 6, so as to make the top thereof lower not to interfere with the coiled portions 7A, 7A of the spring member 7 when the slide door 6 is being opened.

Figure 3A:
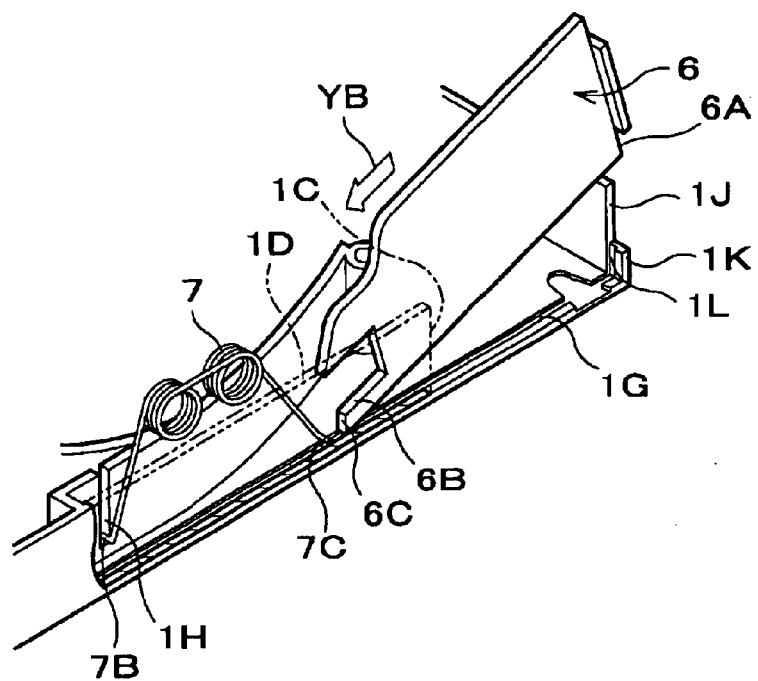
FIG. 3A is a diagram depicting a halfway stage of an operation of mounting the slide door in the lower half of the magnetic tape cartridge of the first embodiment.
Figure 3B:
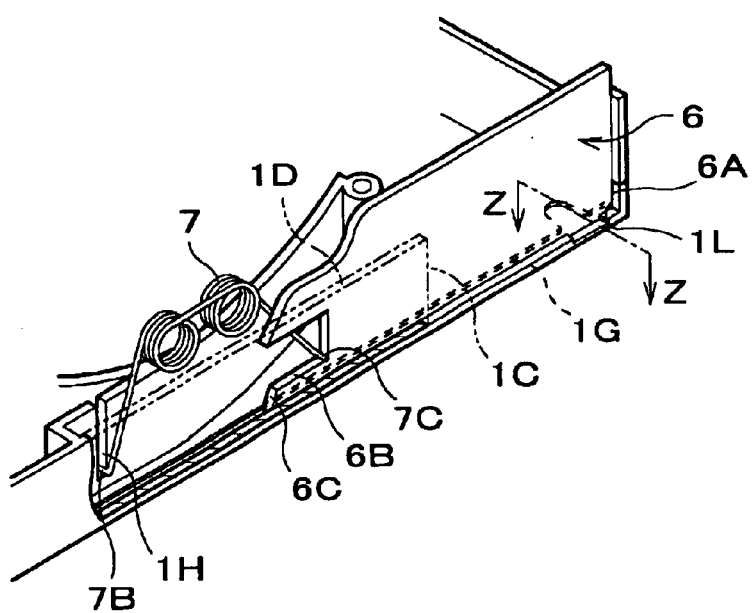
FIG. 3B is a diagram depicting a final state of an operation of mounting the slide door in the lower half of the magnetic tape cartridge of the first embodiment.

When the thus-configured first embodiment of the magnetic tape cartridge is assembled, first mounted in the lower half 1A are a magnetic tape MT, a safety lug 8, a cartridge memory chip (IC chip) 9, a compression coil spring 4, and other parts. Next, as shown in FIG. 3A, the fixable spring arm 7B of the spring member 7 is hooked up at the spring hook portion 1H, and the pressure spring arm 7C is set into the guide groove 1G. The slide door 6 is then put inside the sidewall 1D askew, and the wedge portion 6C is slid along the guide groove 1G toward the pressure spring arm 7C as indicated by an arrow YB in FIG. 3A, to scoop up the pressure spring arm 7C. The pressure spring arm 7C is then hooked up at the spring hook portion 6B, and the slide door 6 is fitted into the guide groove 1G as shown in FIG. 3B.

The slide door 6 as thus fitted into the guide groove 1G is stressed by the action of the spring member 7 as shown in FIG. 1 toward the direction in which the slide door 6 closes the opening 1C so as to keep the opening closed. The slide door 6 tends to fall in a direction perpendicular to a face thereof, particularly toward the inside of the lower half 1A as indicated by an arrow YA in FIG. 4 before the upper half 1B and the lower half 1A are combined, because the guide groove 1G is shallow.

Figure 4:
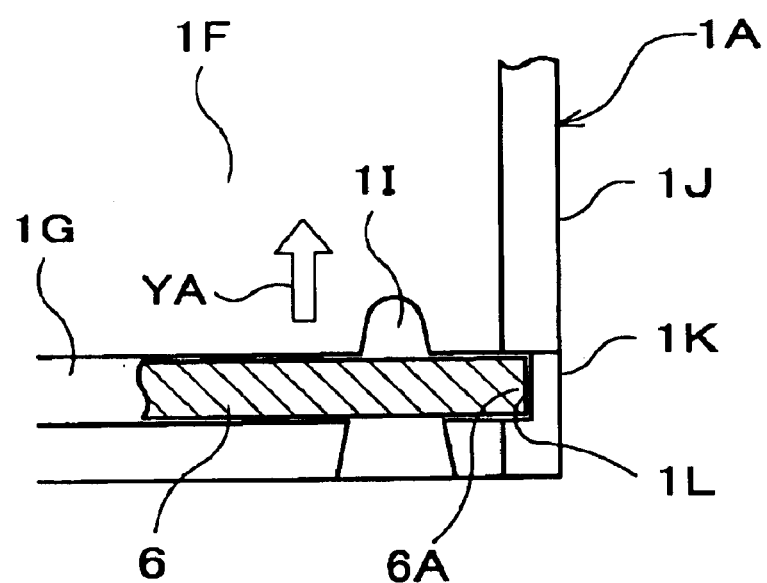
FIG. 4 is a cross-sectional view taken along line Z—Z in FIG. 3B for illustrating a state in which a holding concave portion constituting the magnetic tape cartridge of the first embodiment accommodates a front end portion of the slide door.

However, according to the first embodiment of the magnetic tape cartridge, the contact spot 1K of the lower half 1A is provided with the receiving groove 1L that receives the front edge 6A of the slide door 6 when the slide door 6 has closed the opening 1C, and therefore the slide door 6 that has closed the opening 1C has the front edge 6A thereof fitted in the receiving groove 1L as shown in FIG. 4. This construction may prevent the slide door 6 mounted in the lower half 1A from falling in the direction perpendicular to the face thereof. Accordingly, the slide door 6 would never fail to be neatly fitted into the guide groove 1G of the upper half 1B or lower half 1A, and may be mounted smoothly.

Figure 5A:
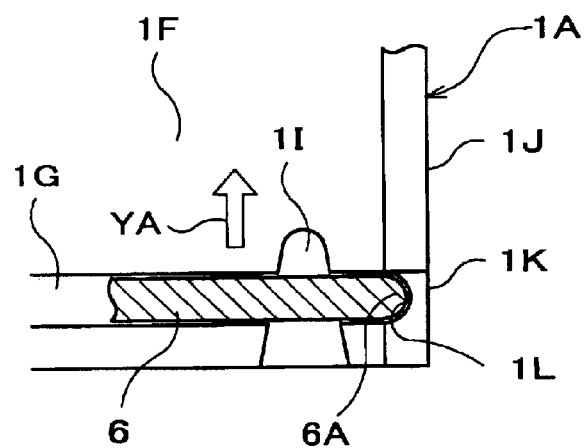
FIG. 5A is a cross-sectional view taken along line Z—Z in FIG. 3B for illustrating another exemplified embodiment of the holding concave portion constituting the magnetic tape cartridge according to the present invention.
Figure 5B:
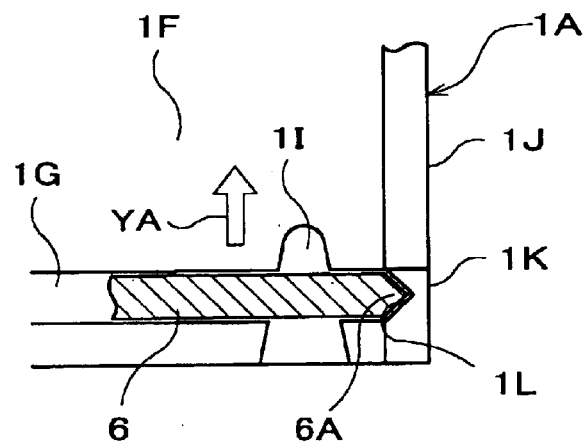
FIG. 5B is a cross-sectional view taken along line Z—Z in FIG. 3B for illustrating yet another exemplified embodiment of the holding concave portion constituting the magnetic tape cartridge according to the present invention.

The magnetic tape cartridge according to the present invention is not limited to those having such a construction as in the above-described first embodiment, but any changes may be made as appropriate without departing from the spirit and scope of the present invention. For example, in the first embodiment, the front edge 6A of the slide door 6 assumes a rectangular form in cross section, and thus the receiving groove 1L provided at the sidewall 1D of the lower half 1A assumedly has an approximately rectangular cross section. However, any shapes that may receive the closed slide door 6 and support both faces at the front end of the slide door 6 to prevent the slide door 6 from falling in the direction perpendicular to the face thereof are applicable to the receiving groove 1L, and the shape of the receiving groove 1L may be modified according to the shape or the like of the front edge 6A of the slide door 6, for example, into that having a U-shaped cross section as shown in FIG. 5A or a V-shaped cross section as shown in FIG. 5B.

Figure 6:
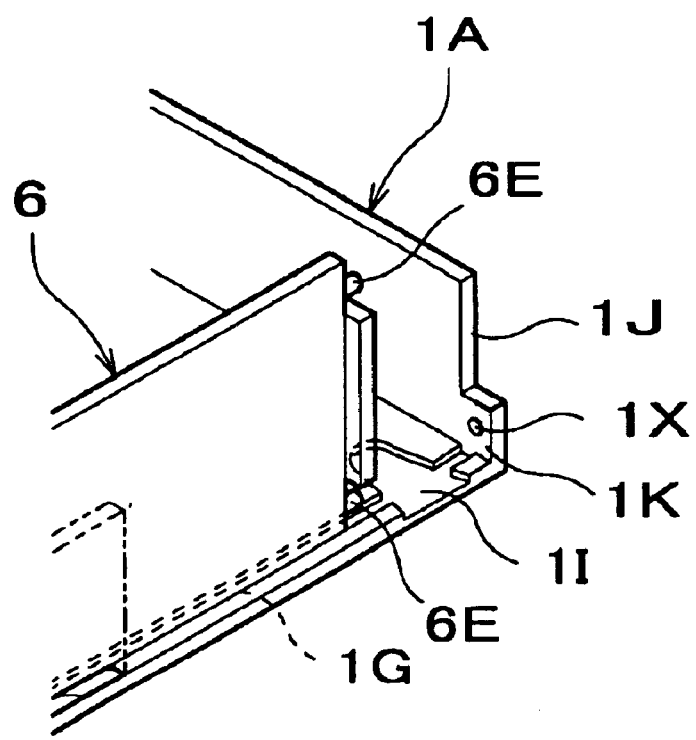
FIG. 6 is a perspective view for illustrating yet another exemplified embodiment of the holding concave portion constituting the magnetic tape cartridge according to the present invention.

Further, in the first embodiment, there is provided the receiving groove 1L that extends vertically along a wall constituting the contact spot 1K of the lower half 1A. However, as shown in FIG. 6, a fittable projection 6E that projects frontward from the front end of the slide door 6 and a fitted hole may be provided respectively on the edge of the slide door 6 and on the contact spot 1K of the lower half, so that the fittable projection 6E may be fitted into the fitted hole 1X when the slide door 6 has closed the opening 1C. This construction may also serve to prevent the slide door 6 provided in the lower half 1A from falling because the fittable projection 6E is put into the fitted hole 1X provided in the contact spot 1K when the slide door 6 has closed the opening 1C. In this construction, the number, size, and shape of the fittable projection 6E and the fitted hole 1X provided respectively on the slide door 6 and the lower half 1A may be arbitrarily determined according to the size of the slide door 6 or the like.

In the above first embodiment, the lower half 1A and the upper half 1B each include the receiving groove 1L. However, if such an assembling process is adopted that the slide door 6 is mounted into the lower half 1A and thereafter the upper half 1B is combined with the lower half 1A to assemble the cartridge case 1, the receiving groove 1L may be provided only in the lower half 1A. Moreover, if such an assembling process is adopted for the cartridge case 1 that the slide door 6 is mounted into the upper half 1B and then combined with the lower half, the receiving groove 1L may be provided only in the upper half 1B.

Figure 7:
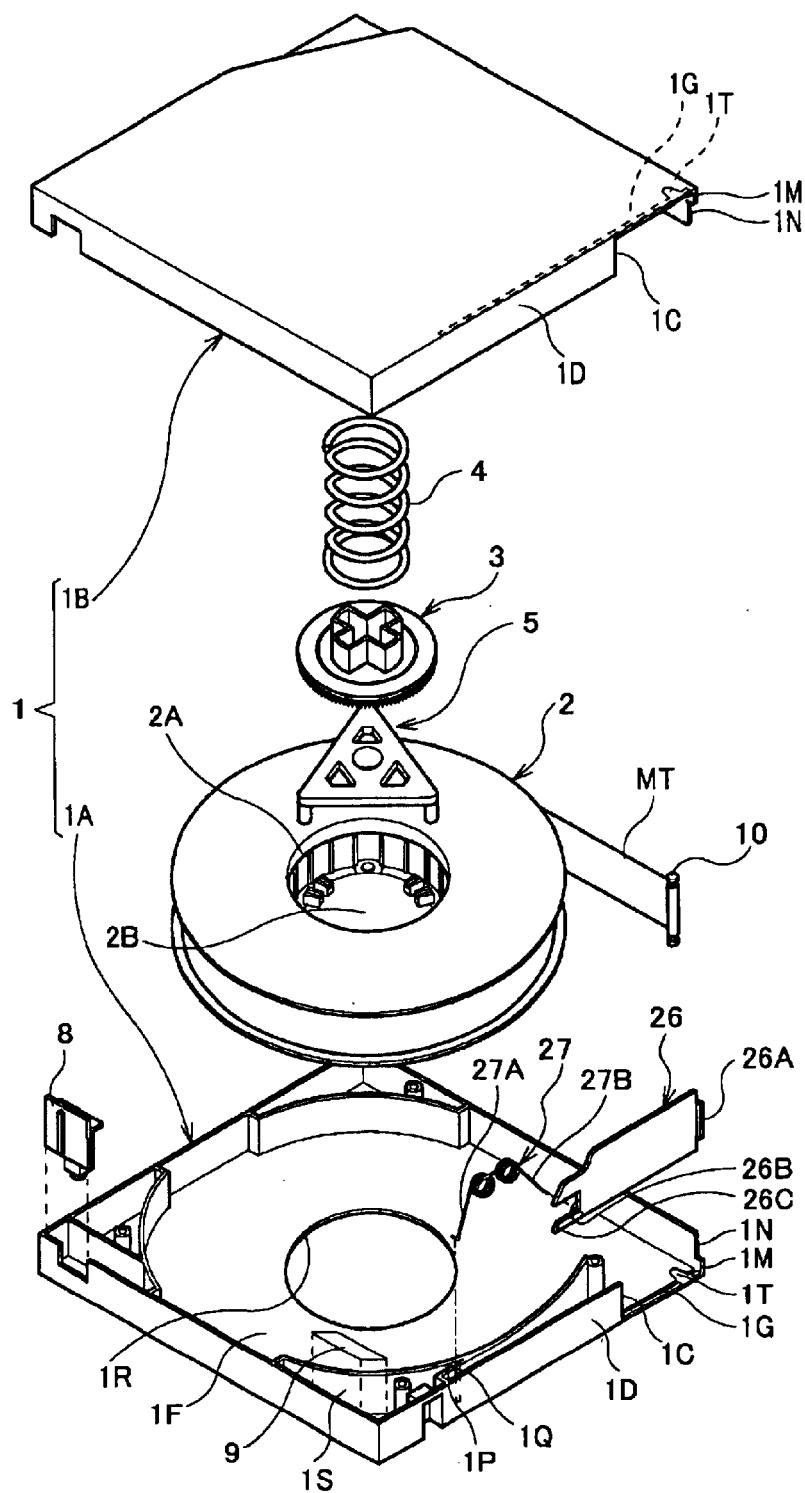
FIG. 7 is an exploded perspective view showing components of a magnetic tape cartridge assembled according to a second embodiment of the present invention.

Next, a description will be given of a method of assembling a magnetic tape cartridge as a second embodiment of the present invention, with reference to FIGS. 7 through 11. In this method, a lower edge of a slide door is fitted into a guide portion of a lower half of a cartridge case, and thereafter an end of the slide door facing a direction in which the slide door moves to close an opening is held by a chuck device, so that the posture of the slide door may be kept appropriately. Among the referenced drawings, FIG. 7 is an exploded perspective view showing components of the magnetic tape cartridge assembled according to the second embodiment of the present invention.

The method of assembling the magnetic tape cartridge according to the second embodiment of the present invention is applied to an LTO standard-compliant model of magnetic tape cartridges as shown in FIG. 1. The magnetic tape cartridge is, as shown in FIG. 7, comprised of a cartridge case separated into a lower half 1A and an upper half 1B; in the cartridge case are included a single reel 2 around which magnetic tape MT is wound, a lock plate 3 and a compression coil spring 4 for locking rotation of the reel 2, a release pad 5 for unlocking the reel 2, a slide door 26 for opening and closing an opening 1C that is provided in a sidewall of the cartridge case 1 to draw out the magnetic tape, a torsion coil spring 27 as a spring member that stresses the slide door 26 toward a position in which the slide door 26 closes the opening 1C, a safety lug 8, a cartridge memory chip (IC chip) 9, and the like.

The above cartridge case 1 includes a substantially rectangular sidewall 1D in the lower half 1A and the upper half 1B respectively, and for example in a right end portion of the sidewall 1D, the opening 1C through which the magnetic tape is drawn out is formed across the lower half 1C and the upper half 1B. On the bottom surface 1F of the lower half 1A, near the inside of the sidewall 1D in which the opening 1C is formed, a shallow guide groove 1G in which the slide door 26 is slidably fitted so that the guide groove 1G guides the slide door 26 is formed as a guide portion. The guide groove 1G is formed in a predetermined range including the opening 1C so that the slide door 26 may open and close the opening 1C along the inside surface of the sidewall 1D. In the upper half 1B as well, a similar guide groove 1G is formed in a predetermined range including the opening 1C. In another sidewall 1D provided adjacently to the opening 1C in the cartridge case 1, an operation opening 1N through which the slide door 26 is operated and opened is formed across the lower half 1A and the upper half 1B so that a stopper portion 1M for stopping the slide door 26 at a position where the slide door 26 closes the opening 1C is left in.

In the lower half 1A, a coupling rib 1P on the opposite side of the guide groove 1G to the sidewall 1D is formed with a spring hook slit 1Q that hooks up a distal end of an arm portion 27A at one end of the torsion coil spring 27, which distal end is bent so as to assume a shape of letter L. The spring hook slit 1Q is formed downwardly to reach a predetermined depth from a top of the coupling rib 1P. A circular opening 1R is formed in a midsection of the bottom surface 1F of the lower half 1A; in the outside the circular opening 1R, arc ribs 1S surrounding the reel 2 are provided in contiguity with the side walls 1D. Arc ribs are also formed in the upper half 1B, though not shown in the drawing. The cartridge case 1 is formed with holding concave portions 1T for holding the leader pin 10 that will be described later in a position facing the opening 1C inside the slide door 36, at respective positions in the upper half 1B and the lower half 1A corresponding to upper and lower ends of the leader pin 10.

The reel 2 includes a cupped hub 2A of which an opening faces the upper half 1B in a midsection of the reel 2; on the bottom surface 2B of the cupped hub 2A, the release pad 5, lock plate 3, and compression coil spring 4 are mounted in this sequence. An external face of the bottom surface 2B of the cupped hub 2A is exposed through the circular opening 1R formed in the midsection of the bottom surface 1F of the lower half 1A so that the reel 2 may be driven to rotate by a reel driving mechanism in a driving device (not shown) into which the magnetic tape cartridge is loaded. On a distal end of the magnetic tape MT wound up around the reel 2, the leader pin 10 to be drawn out with a hook of a loading mechanism in the driving device is fastened. The both ends of the leader pin 10 are held in the holding concave portion 1T in the cartridge case 1, so that the leader pin 10 is held in a position facing the opening 1C inside the slide door 26.

Figure 8A:
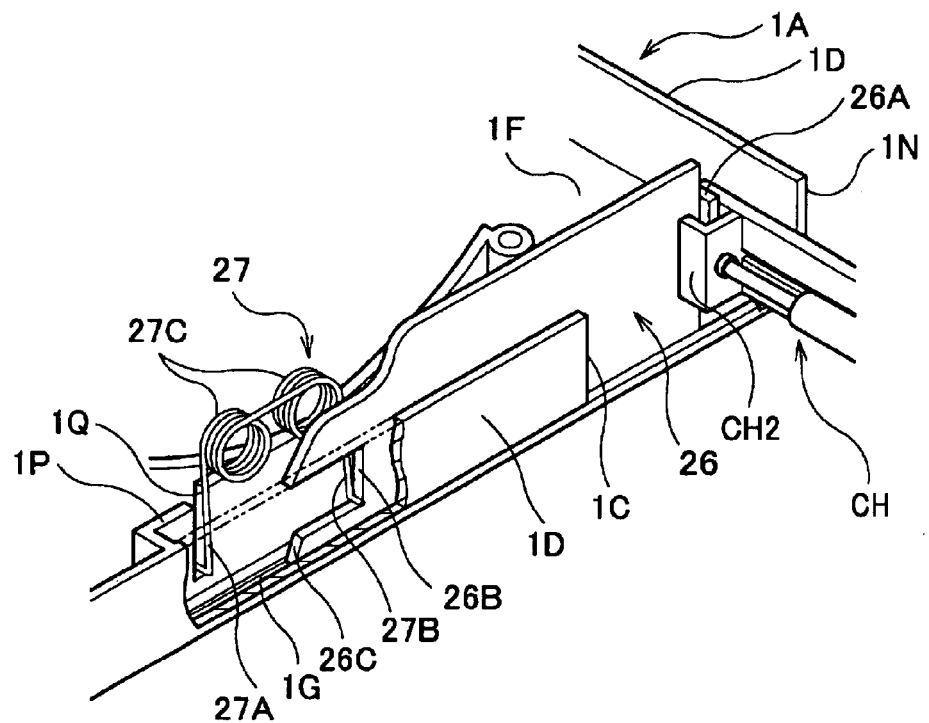
FIG. 8A is a perspective view showing a first operation process for assembling the magnetic tape cartridge according to the second embodiment of the present invention.

The slide door 26 is shaped like a rectangular landscape thin plate with upper and lower edges slidably fitted into the guide grooves 1G of the upper half 1B and the lower half 1A respectively. At a front end of the slide door 26 facing a direction in which the slide door 26 moves to close the opening 1C, an operation protrusion bar 26A operable to open the slide door 26 is formed. The operation protrusion bar 26A is provided in a position facing an inside of an operation opening 1N of the cartridge case 1 so that the operation protrusion bar 26A may be pushed and moved by an operation arm (not shown) attached to the loading mechanism in the driving device. At the rear end of the slide door 26 facing a direction in which the slide door 26 moves to open the opening 1C, a spring hook depression 26B to which an L-shaped distal end of the arm portion 27B at the other end of the torsion coil spring 27 is hooked up is formed. At a lower rear end surface of the slide door 26, that is a lower portion provided below the spring hook depression 26B, is formed a guide bevel 26C capable of scooping the L-shaped distal end of the arm portion 27B to guide the same into the spring hook depression 26B. The torsion coil spring 27, as shown in FIG. 8A, includes two coiled portions 27C provided in series between the arm portion 27A at one end and the arm portion 27B at the other end to allow the torsion coil spring 27 a lot of latitude in a stroke of expansion. The two arm portions 27A, 27B are configured to extend from the two coiled portions 27C toward the same side in one plane with respect to a line containing proximal ends of the arm portions 27A, 27B. A distal end of the arm portion 27A at one end is bent so as to assume a shape of letter L to which a spring hook slit 1Q may be hooked up, while a distal end of the arm portion 27B at the other end is bent so as to assume a shape of letter L that may be fitted into the guide groove 1G of the lower half 1A and scooped by the guide bevel 26C of the slide door 26. It is to be understood that the torsion coil spring 27 may be configured to extend from the coiled portions 27C toward the opposite sides in one plane with respect to a line containing proximal ends of the arm portions 27A, 27B. Further, the torsion coil spring 27 may be configured to have only one coiled portion.

Figure 8B:
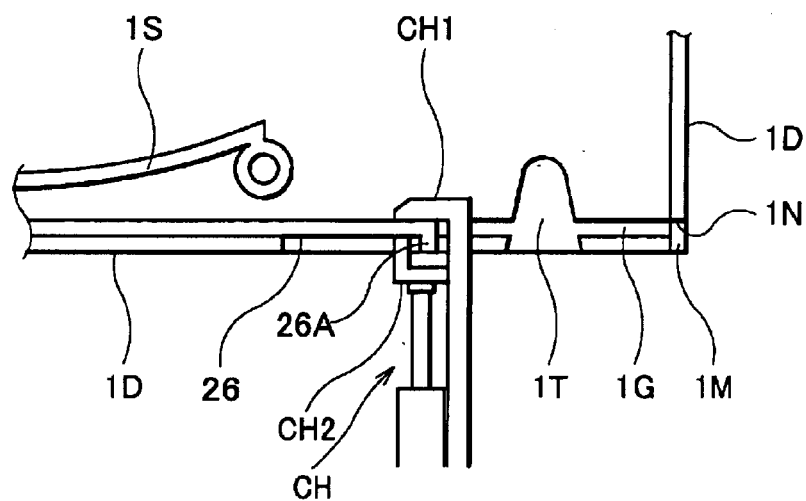
FIG. 8B is a plan view showing the first operation process for assembling the magnetic tape cartridge according to the second embodiment of the present invention.
Figure 9:
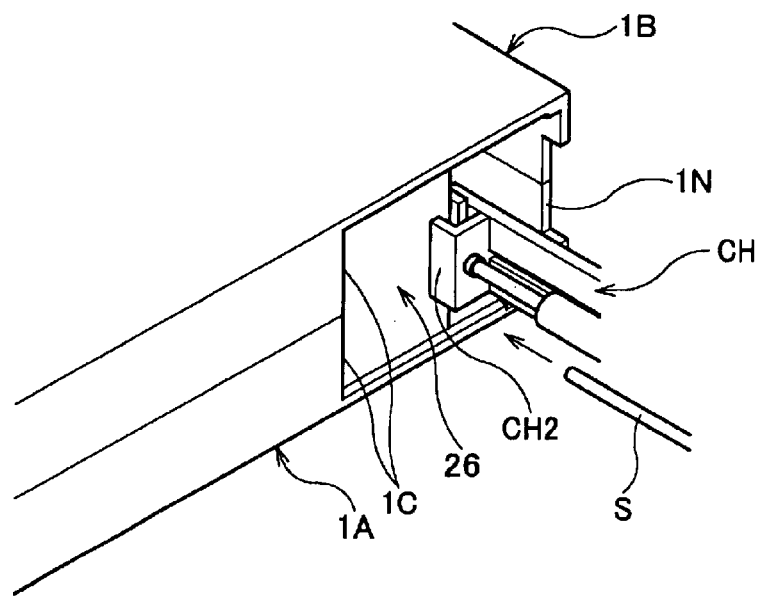
FIG. 9 is a perspective view showing a second operation process for assembling the magnetic tape cartridge according to the second embodiment of the present invention.
Figure 10:
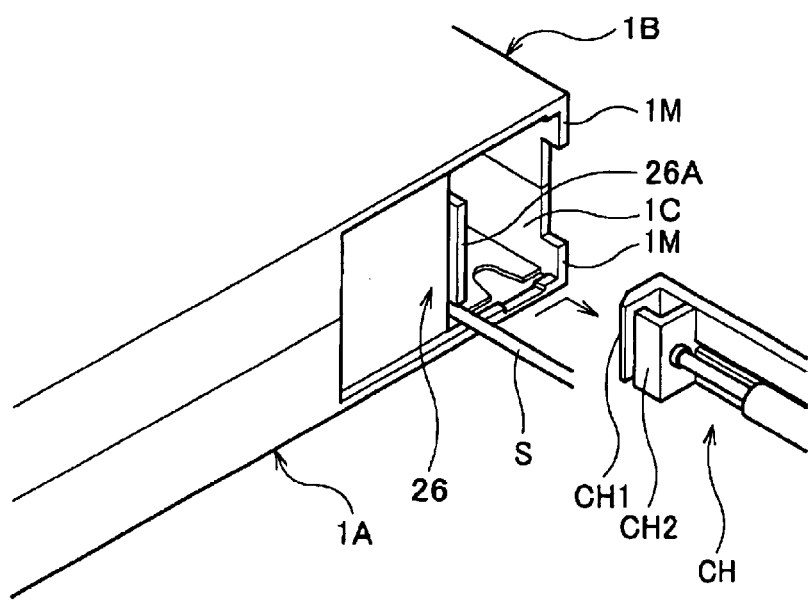
FIG. 10 is a perspective view showing a third operation process for assembling the magnetic tape cartridge according to the second embodiment of the present invention.
Figure 11:
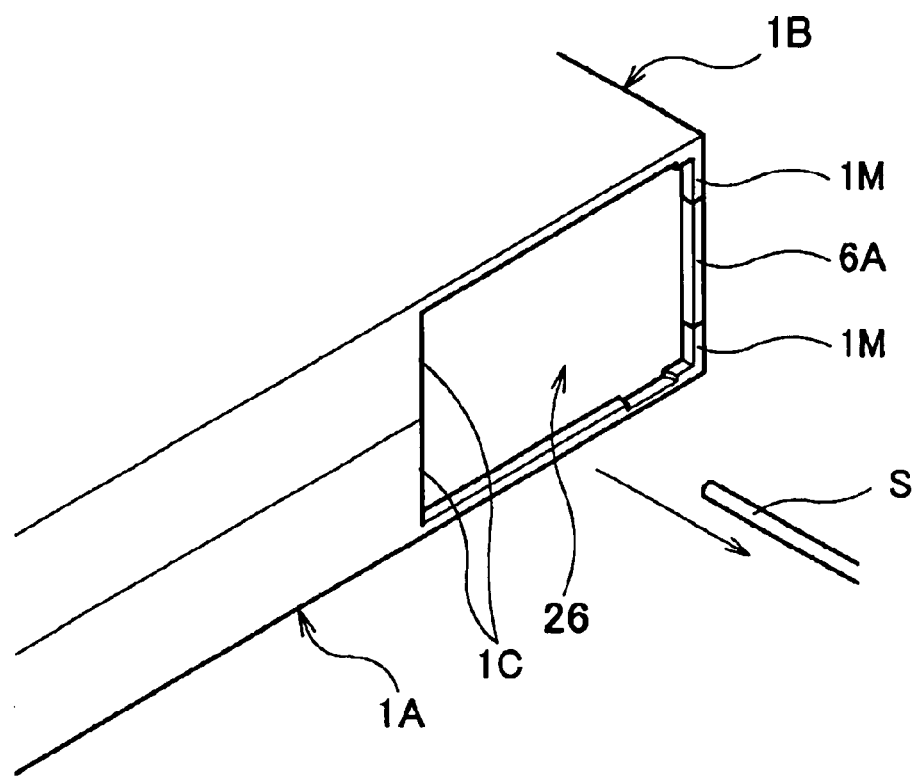
FIG. 11 is a perspective view showing a fourth operation process for assembling the magnetic tape cartridge according to the second embodiment of the present invention.

When the thus-configured magnetic tape cartridge is assembled according to the second embodiment of the present invention, the slide door 26 together with the torsion coil spring 27 is mounted into the cartridge case 1 by following a first operation step as shown in FIG. 8, a second operation step as shown in FIG. 9, a third operation step as shown in FIG. 10, and a fourth operation step as shown in FIG. 11. A description will be given of the method of assembling the slide door as the second embodiment of the present invention step by step with reference made to FIGS. 7 through 10.

First, all internal components except the slide door 26 and the torsion coil spring 27 are mounted each in a predetermined location in the lower half 1A as shown in FIG. 7. The internal components include a reel 2, a lock plate 3, a compression coil spring 4, a safety lug 8, a cartridge memory chip 9, and the like. The assembly operation may be performed manually, but a dedicated assembly device or a general-purpose assembly robot may be used, as well.

Next, as a first-half stage of the first operation step, as shown in FIG. 8A, a lower edge of the slide door 26 is fitted into the guide groove 1G as a guide portion of the lower half 1A, while the slide door 26 is being stressed by the torsion coil spring 27 as a spring member toward a direction in which the slide door 26 moves to close the opening 1C. In this assembly operation, first, the L-shaped distal end at one end of the arm portion 27A is inserted into the spring hook slit 1Q of the coupling rib 1P and hooked up, and the L-shaped distal end at the other end of the arm portion 27B is inserted into the guide groove 1G. Subsequently, the lower edge of the slide door 26 is fitted into the guide groove 1G while the slide door 26 is located in a position in which the slide door 26 closes the opening 1C (to the right side in FIG. 8). Thereafter, the slide door 26 is slid toward a direction in which the slide door 26 moves to open the opening 1C (to the left side in FIG. 8). Accordingly, the L-shaped distal end of the arm portion 27B at the other end of the torsion coil spring 27 is scooped by the guide bevel 6C provided near the lower edge of the slide door 26, and fitted into the spring hook depression 26B. Thus, the lower edge of the slide door 26 is fitted into the guide groove 1G of the lower half 1A, while the slide door 26 is being stressed by the torsion coil spring 27 toward the direction in which the slide door 26 moves to close the opening 1C. The operations as described above may be performed by a dedicated assembly device or an assembly robot.

Next, as a latter-half stage of the first operation step, as shown in FIGS. 8A, 8B, the front end of the slide door 26 facing the direction in which the slide door 26 moves to close the opening 1C is held with a chuck device CH so that an assembly position of the slide door 26 is kept. The chuck device CH as used herein may be controlled to adjust a position at least in X-Y directions (front-rear and right-left directions), and thus includes an immovable chuck piece CH1 and a movable chuck piece CH2 that may move toward or away from the immovable chuck piece CH 1. The immovable chuck piece CH2 may be driven, for example, by an electromagnetic actuator. The chuck device CH as described above holds the end of the slide door 26 facing the direction in which the slide door 26 moves to close the opening 1C between the immovable chuck piece CH1 and the L-shaped movable chuck piece CH2 extending across the operation protrusion bar 26A as shown in FIG. 8B, and thus keeps an upright posture of the slide door 26 without leaning or falling.

Following the first operation step, in the second operation step, the upper half 1B is combined with the lower half 1A, as shown in FIG. 9. This operation may be performed manually or using a dedicated assembly device or an assembly robot. At this stage, the slide door 26 has its posture kept upright by the chuck device CH without leaning to the left or right, or falling frontward or backward, and thus the upper edge of the slide door 26 may be securely fitted into the guide groove 1G of the upper half 1B (see FIG. 7). Accordingly, even if a dedicated assembly device or an assembly robot is used to combine the upper half 1B with the lower half 1A, the assembly operation of the slide door 26 may be securely carried out.

Thereafter, in the third operation step, while an front end face of the slide door 26 facing the direction in which the slide door 26 moves to close the opening 1C is stopped with a stopper rod S, the slide door 26 held by the chuck device is released, as shown in FIG. 10. The stopper rod S may be selected among any components that may penetrate and retract through the opening 1C of the cartridge case 1 that is openably closed by the slide door 26. The usable stopper rod S includes an operation rod for an electromagnetic actuator, and a rod member coupled therewith, for example. The direction of penetration and retraction of the stopper rod S is not limited to a direction perpendicular to a plane containing the opening 1C, but may be any directions oblique to the plane containing an open edge of the opening 1C. When the stopper rod S penetrates into the opening 1C and stops the front end of the slide door 26, the chuck device CH opens by separating the movable chuck piece CH2 from the immovable chuck piece CH1, and moves a predetermined distance to the right as indicated by an arrow in FIG. 10, thereafter moving back to release the slide door 26. Accordingly, the chuck device CH may be smoothly detached from the front end of the slide door 26 that is being stressed toward the direction in which the slide door 26 moves to close the opening 1C.

Subsequently, in the fourth operation step, the stopper rod S is retracted from the opening 1C to release the slide door 26, as shown in FIG. 11. Consequently, the slide door 26 slides toward the direction in which the slide door 26 may close the opening 1C by the action of the torsion coil spring 27 as shown in FIG. 8; the front end of the slide door 26 is brought into contact with the upper and lower stopper portions 1M, 1M of the cartridge case 1, and is kept in a position where the slide door 26 closes the opening 1C. In this state, the operation protrusion bar 26A of the slide door 26 faces the operation opening 1N (see FIGS. 9 and 10) between the upper and lower stopper portions 1M, 1M, and is fitted into the operation opening 1N.

In the method of assembling the magnetic tape cartridge according to the second embodiment of the present invention, although the end of the slide door 26 facing the direction in which the slide door 26 moves to close the opening 1C is stopped using the stopper rod S after the lower half 1A and the upper half 1B are combined, the end of the slide door 26 facing the direction in which the slide door 26 moves to close the opening 1C may be stopped using the stopper rod S before the lower half 1A and the upper half 1B are combined, if the end of the slide door 26 facing the direction in which the slide door 26 moves to close the opening 1C has been held by the chuck device CH to keep a posture of the slide door 26.

Figure 12:
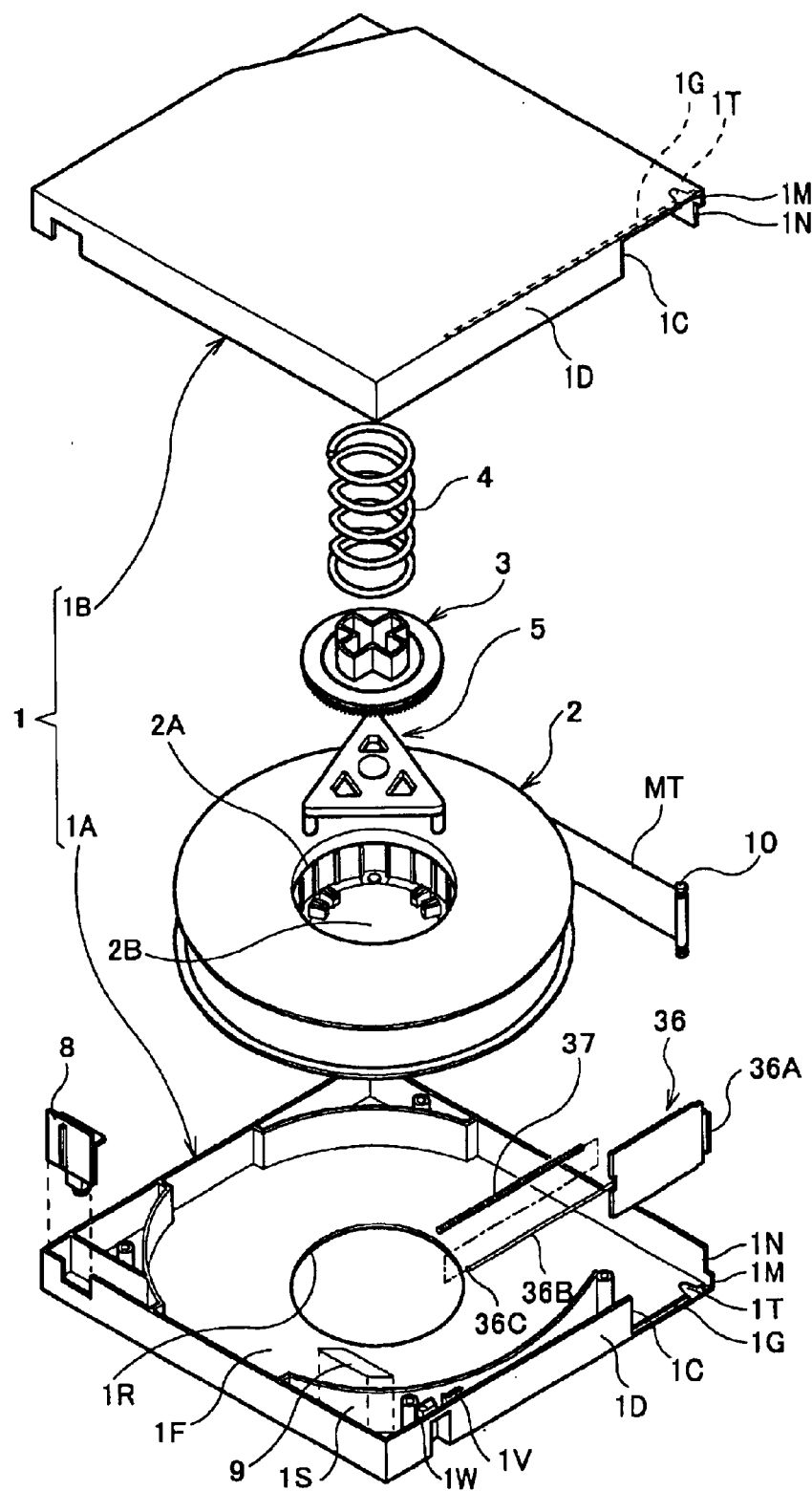
FIG. 12 is an exploded perspective view showing components of a magnetic tape cartridge assembled according to a third embodiment of the present invention.

Next, a description will be given of a method of assembling a magnetic tape cartridge according to a third embodiment of the present invention with reference to FIGS. 12 through 16. In this method, a lower edge of the slide door is fitted into a guide portion of the lower half, and thereafter an appropriated spot of the end of the slide door facing a direction in which the slide door moves to close the opening is pushed and held so that the end of the slide door facing a direction in which the slide door moves to open the opening is prevented from rising by the stress of the spring member. Among the referenced drawings, FIG. 12 is an exploded perspective view showing components of a magnetic tape cartridge assembled according to the third embodiment of the present invention.

The method of assembling the magnetic tape cartridge according to the third embodiment of the present invention is applied to the LTO standard-compliant model of magnetic tape cartridges as shown in FIG. 7. The magnetic tape cartridge is, as shown in FIG. 12, comprised of a cartridge case separated into a lower half 1A and an upper half 1B; in the cartridge case are included a single reel 2 around which magnetic tape MT is wound, a lock plate 3 and a compression coil spring 4 for locking rotation of the reel 2, a release pad 5 for unlocking the reel 2, a slide door 36 for opening and closing an opening 1C provided in a sidewall of the cartridge case 1 through which the magnetic tape is drawn out, a torsion coil spring 37 as a spring member that stresses the slide door 36 toward a position in which the slide door 36 closes the opening 1C, a safety lug 8, a cartridge memory chip 9, and the like.

The above cartridge case 1 has a substantially square-shaped contour as viewed from a top thereof, and includes four sidewalls 1D in the lower half 1A and the upper half 1B respectively, and for example in a right end portion of one sidewall 1D among them, the opening 1C through which the magnetic tape is drawn out is formed across the lower half 1A and the upper half 1B. On the bottom surface 1F of the lower half 1A, near the inside of the sidewall 1D in which the opening 1C is formed, a shallow guide groove 1G in which the slide door 36 is slidably fitted so that the guide groove 1G guides the slide door 36 is formed as a guide portion. The guide groove 1G is formed in a predetermined range including the opening 1C so that the slide door 36 may open and close the opening 1C along the inside surface of the sidewall 1D. In the upper half 1B as well, a similar guide groove 1G is formed in a predetermined range including the opening 1C. In another sidewall 1D provided adjacently to the opening 1C in the cartridge case 1, an operation opening 1N through which the slide door 36 is operated and opened is formed across the lower half 1A and the upper half 1B, while a stopper portion 1M for stopping the slide door 36 at a position where the slide door 36 closes the opening 1C is left in.

Figure 13:
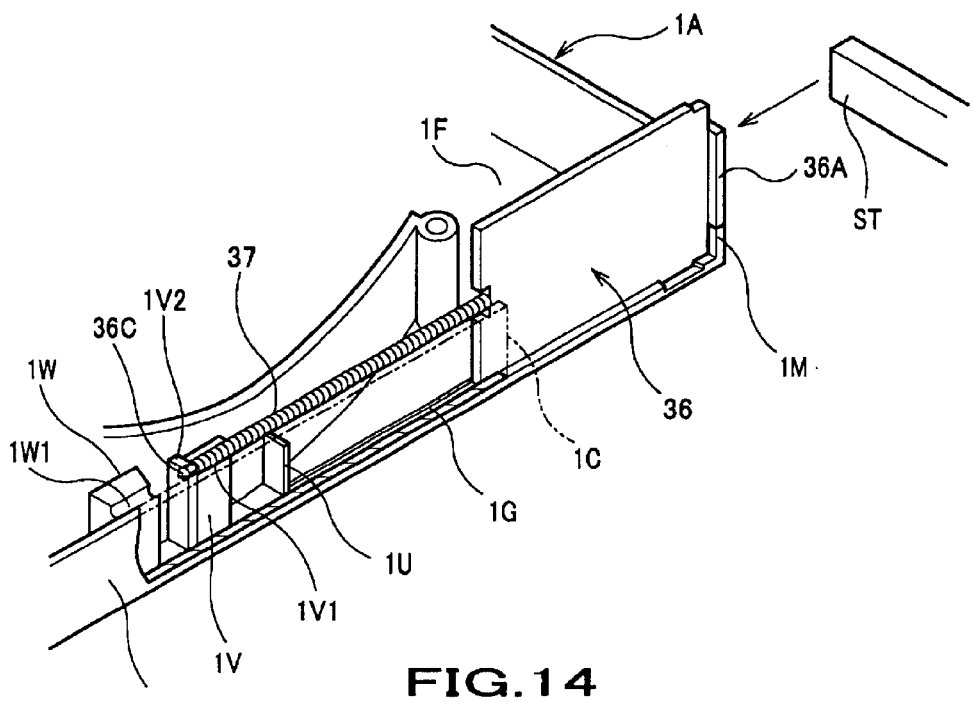
FIG. 13 is a perspective view showing a first operation process for assembling the magnetic tape cartridge according to the third embodiment of the present invention.

In the lower half 1A, at a side of the slide door 36 facing the direction in which the slide door 36 guided by the guide groove 1G moves to open the opening 1C, a stopper piece 1U, a spring receiving block 1V, and a stem receiving block 1W are provided in contiguity with the sidewall 1D, as shown in FIG. 13, each spaced apart from each other and projecting from the bottom surface 1F. The stopper piece 1U is projected at an end position of the guide groove 1G, and brought into contact with the end of the slide door 36 facing the direction in which the slide door 36 moves to open the opening 1C to stop the slide door 36 at a position where the slide door 36 fully opens the opening 1C. On an upper edge of the spring receiving block 1V, a spring receiving groove 1V1 that has a cross section shaped like an arc and receives one end of the compression coil spring 37 is formed, and a spring receiving piece 1V2 that blocks one end of the compression coil spring 37 is provided. The spring receiving piece 1V2 is so provided upwardly from proximity of the spring receiving groove 1V1 as to slightly project into the spring receiving groove 1V1. Further, on the upper edge of the stem receiving block 1W is formed with a stem receiving groove 1W1 that has a cross section shaped like an arc to receive a spring support rod 36B that will be described later (as shown in FIG. 12) of the slide door 36.

As shown in FIG. 12, a circular opening 1R is formed in a middle section of the bottom portion 1F of the lower half 1A, and an arc-shaped rib 1S surrounding the reel 2 is provided in contiguity with the sidewall 1D outside the circular opening 1R. Though not illustrated, a similar arc-shaped rib is formed in the upper half 1B. In the cartridge case 1, a holding concave portion 1T for holding a leader pin 10 that will be described later in a position facing the opening 1C inside the slide door 36 is formed at each of the upper half 1B and the lower half 1A as corresponding to the upper and lower ends of the leader pin 10.

The reel 2 includes a cupped hub 2A of which an opening faces the upper half 1B in a middle section of the reel 2; on the bottom surface 2B of the cupped hub 2A, the release pad 5, lock plate 3, and compression coil spring 4 are mounted in this sequence. An external face of the bottom surface 2B of the cupped hub 2A is exposed through the circular opening 1R formed in the midsection of the bottom surface 1F of the lower half 1A so that the reel 2 may be driven to rotate by a reel driving mechanism in a driving device (not shown) into which the magnetic tape cartridge is loaded. On a distal end of the magnetic tape MT wound up around the reel 2, the leader pin 10 to be drawn out by a hook of a loading mechanism in the driving device is fastened. The both ends of the leader pin 10 are held in the holding concave portion 1T in the cartridge case 1, so that the leader pin 10 is held in a position facing the opening 1C inside the slide door 36.

The slide door 36 is shaped like a rectangular landscape thin plate with upper and lower edges slidably fitted into the guide grooves 1G of the upper half 1B and the lower half 1A respectively. At a front end of the slide door 36 facing a direction in which the slide door 36 moves to close the opening 1C, an operation protrusion bar 36A operable to open the slide door 36 is formed. The operation protrusion bar 36A is provided in a position facing an inside of an operation opening 1N of the cartridge case 1 so that the operation protrusion bar 36A may be pushed and moved by an operation arm (not shown) attached to the loading mechanism in the driving device. In a vertically middle section of the rear end of the slide door 36 facing a direction in which the slide door 36 moves to open the opening 1C, a spring support rod 36B around which the compression coil spring 37 is wound is provided toward rearward. At a distal end of the spring support rod 36B is formed a stopper head 36C having a slot that may reduce a diameter of the head so that the stopper head 36C may be inserted into the compression coil spring 37.

The compression coil spring 37 is a thin-helix long coil spring, which is fitted on the spring support rod 36B of the slide door 36 with the diameter of the stopper head 36C at the distal end of the spring support rod 36B reduced. The diameter of the fitted stopper head 36C expands by the action of elastic recovery, with the result that the compression coil spring 37 is secured so as not to come off; the compression coil spring 37 is wound around the spring support rod 36B in such a manner that permits compressive deformation.

Figure 14:
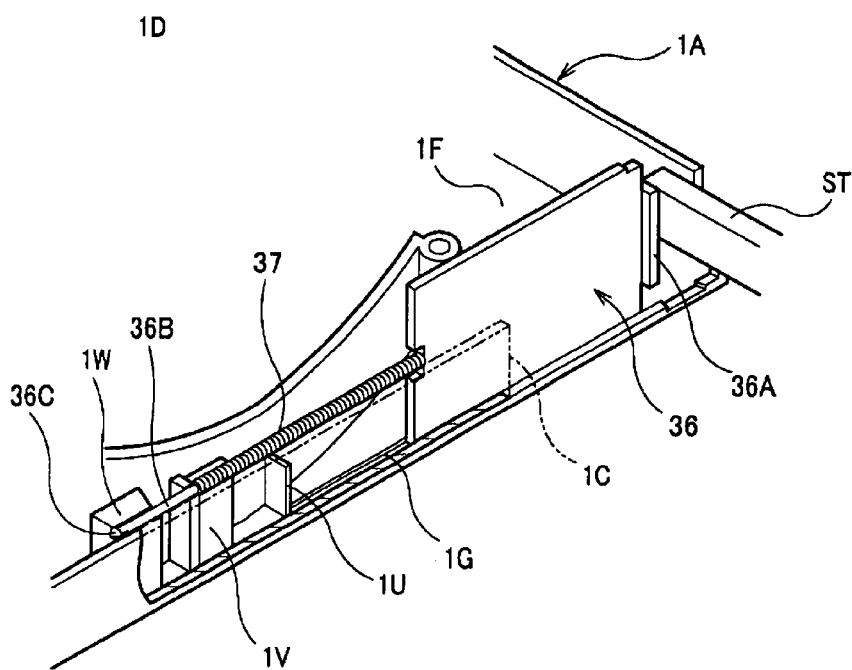
FIG. 14 is a perspective view showing a second operation process for assembling the magnetic tape cartridge according to the third embodiment of the present invention.
Figure 15:
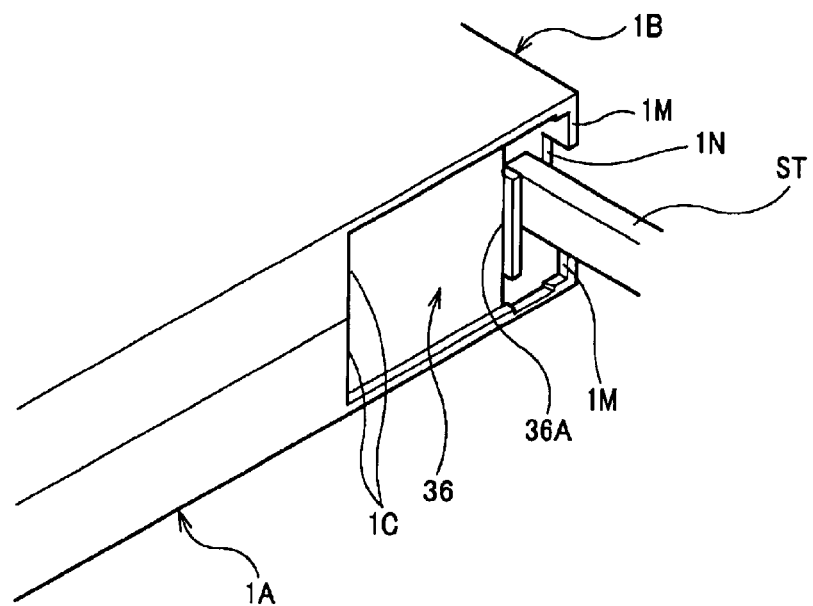
FIG. 15 is a perspective view showing a third operation process for assembling the magnetic tape cartridge according to the third embodiment of the present invention.
Figure 16:
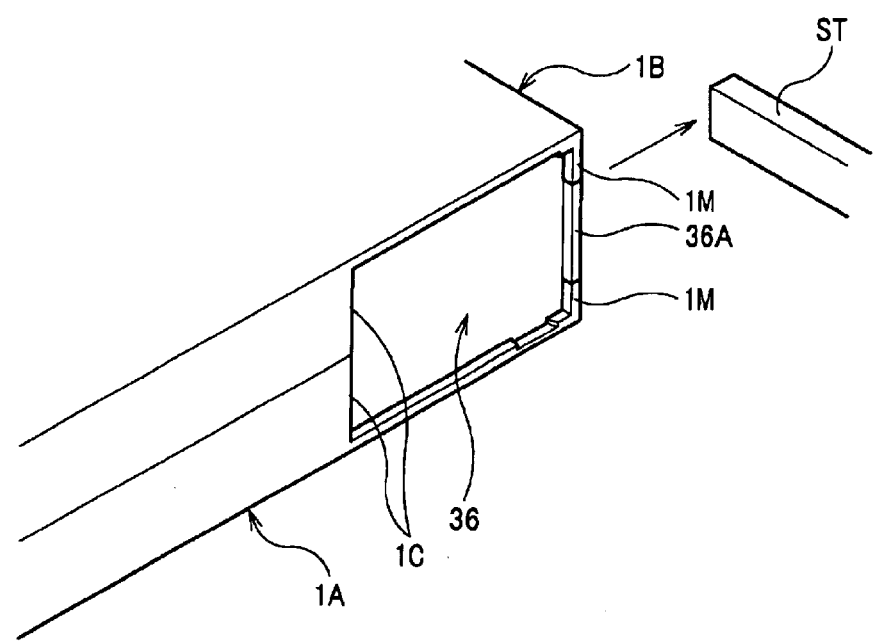
FIG. 16 is a perspective view showing a fourth operation process for assembling the magnetic tape cartridge according to the third embodiment of the present invention.

When the thus-configured magnetic tape cartridge is assembled according to the third embodiment of the present invention, the slide door 36 together with the compression coil spring 37 is mounted into the cartridge case 1 by following a first operation step as shown in FIG. 13, a second operation step as shown in FIG. 14, a third operation step as shown in FIG. 15, and a fourth operation step as shown in FIG. 16. A description will be given of the method of assembling the slide door as the third embodiment of the present invention step by step, with reference to FIGS. 12 through 16.

First, all internal components except the slide door 36 and the compression coil spring 37 are mounted each in a predetermined location in the lower half 1A as shown in FIG. 12. The internal components include a reel 2, a lock plate 3, a compression coil spring 4, a safety lug 8, a cartridge memory chip 9, and the like. The assembly operation may be performed manually, but a dedicated assembly device or a general-purpose assembly robot may be used, as well.

Next, prior to the first operation step, the compression coil spring 37 is wound around the spring support rod 36B and secured so as not to come off using the stopper head 36C. Thereafter, as the first operation step, as shown in FIG. 13, a lower edge of the slide door 36 is fitted into the guide groove 1G as a guide portion of the lower half 1A, while the slide door 36 is being stressed by the compression coil spring 37 as a spring member toward a direction in which the slide door 36 moves to close the opening 1C.

In the first operation step, first, the slide door 36 is held in such a slightly tilted posture that the spring support rod 36B may orient obliquely in a gently declining direction. The stopper head 36C at the distal end of the spring support rod 36B is then brought into contact with the spring receiving groove 1V1 on the spring receiving block 1V. Subsequently, the slide door 36 is slightly moved in a direction to open the opening 1C (to the left in FIG. 13) so that the stopper head 36 may pass on a side of the spring receiving piece 1V2 along the spring receiving groove 1V1.

Then, the slide door 36 is lowered toward the guide groove 1G in the lower half 1A while an upright orientation of the slide door 36 is being restored, and the lower edge thereof is fitted into the guide groove 1G. Thereafter, the slide door 36 is slightly moved in a direction to close the opening 1C (to the right in FIG. 13) along the guide groove 1G, so that the front end of the slide door 36 is brought into contact with the stopper portion 1M in the lower half 1A; consequently, the slide door 36 is released. The above operations are continuously performed manually, or using a dedicated assembly device or an assembly robot.

Since one end of the compression coil spring 37 wound around the spring support rod 36B (see FIG. 12) is hooked up to the spring receiving piece 1V2 of the spring receiving block 1V, the slide door 36 of which the lower edge is fitted in the guide groove 1G of the lower half 1A in the first operation step is stressed toward the direction to close the opening 1C (to the right in FIG. 13) by the action of the compression coil spring 37, and a lower portion of the front end is pressed by the stopper portion 1M. Under these conditions, the stress of the compression coil spring 37 is directed substantially to a vertically middle spot of the slide door 36, and the spot or point of action is higher than a position of the stopper portion 1M, so that the slide door 36 gets tilted so as to allow the end facing the direction in which the slide door 36 moves to open the opening 1C (the left side in FIG. 13) to rise slightly while the stopper portion 1M serves as a fulcrum. As a result, the lower edge of the slide door 36 rises, at the end facing the direction in which the slide door 36 moves to open the opening 1C, from the guide groove 1G.

Therefore, in the second operation step, as shown in FIG. 14, an appropriate spot at the front end of the slide door 36 facing the direction in which the slide door 36 moves to close the opening 1C (at the right side in FIG. 14) is pushed and anchored so as to prevent the end of the slide door 36 facing the direction in which the slide door 36 moves to open the opening 1C (at the left side in FIG. 14) from rising by the stress of the compression coil spring 37. To be more specific, as shown in FIGS. 13 and 14, an upper portion of the operation protrusion bar 36A located in a higher position than the point of action of the stress of the compression coil spring 37 is pressed and anchored using a stopper arm ST. The stopper arm ST is controlled to position so as to be movable at least in directions in which the slide door 36 moves to open or close the opening 1C in such a position that a distal end of the stopper arm ST may translate and pass through the operation opening 1N (see FIG. 15) of the cartridge case 1.

Next, in the third operation step, as shown in FIG. 15, the upper half 1B is combined with the lower half 1A. This operation is performed manually, or using a dedicated assembly device or an assembly robot. Since the slide door 36 is kept untilted in an upright posture using the stopper arm ST to prevent the end facing the direction in which the slide door 36 moves to open the opening 1C (at the left side in FIG. 13) from rising, the lower edge and the upper edge of the slide door 36 are properly aligned with and securely fitted into the guide groove 1G in the lower half 1A and the guide groove 1G in the upper half 1B (see FIG. 12), respectively. Accordingly, in case where the upper half 1B is combined with the lower half 1A using a dedicated assembly device or an assembly robot, the slide door 36 may also be securely mounted.

Thereafter, in the fourth operation step, as shown in FIG. 16, the stopper arm ST is moved toward a direction in which the slide door 36 moves to close the opening 1C (to the right in FIG. 16) to get out through the operation opening 1N between the upper and lower stopper portions 1M, 1M of the cartridge case 1 (see FIG. 15). The slide door 36 thereby slides toward the direction to close the opening 1C by the action of the compression coil spring 37 (see FIG. 14); the front end thereof is brought into contact with the upper and lower stopper portions 1M, 1M of the cartridge case 1 and kept in a fully closing position. In this situation, the operation protrusion bar 36A of the slide door 36 is aligned with and fitted into the operation opening 1N between the upper and lower stopper portions 1M, 1M (see FIG. 15).

Figure 17:
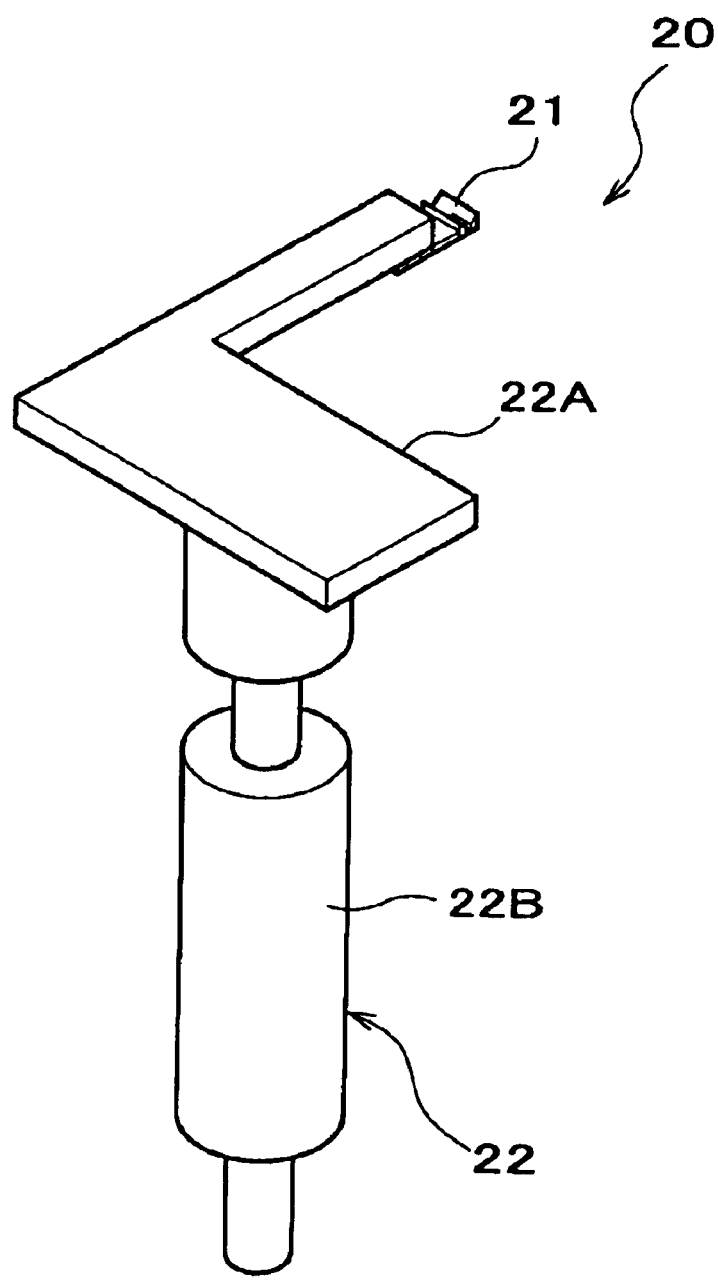
FIG. 17 is a perspective view showing a whole structure of an assembly supportive device for a magnetic tape cartridge according to a fourth embodiment of the present invention.

Subsequently, referring to FIGS. 17 through 22, a description will be given of an assembly supportive device for a magnetic tape cartridge according to a fourth embodiment of the present invention. Among the referenced drawings, FIG. 17 is a perspective view showing a whole structure of the assembly supportive device for a magnetic tape cartridge according to a fourth embodiment of the present invention. The assembly supportive device for a magnetic tape cartridge is used, for example, in assembling operations of the magnetic tape cartridge as shown in FIGS. 12 and 13 according to the third embodiment of the present invention. Thus, a detailed description of the magnetic tape cartridge assembled according to the above assembly operations will be omitted herein.

The assembly supportive device for a magnetic tape cartridge according to the fourth embodiment of the present invention is, as shown in FIGS. 12 and 13, used to securely guide the stopper head 36C provided at a distal end of the spring support rod 36B of the slide door 36 into the support rod receiving groove 1V1 on the support rod receiving block 1V in the lower half 1A when the slide door 36 of the magnetic tape cartridge is fitted in the lower half 1A of the cartridge case 1.

As shown in FIG. 17, the assembly supportive rod 20 includes a guide member 21, a positioning device 22 capable of moving the guide member 21 from a retraction position to a use position. The positioning device 22 includes a pivot arm 22A to which the guide member 21 is attached, a linear twist 22B that moves the pivot arm 22A vertically and pivotally.

Figure 18:
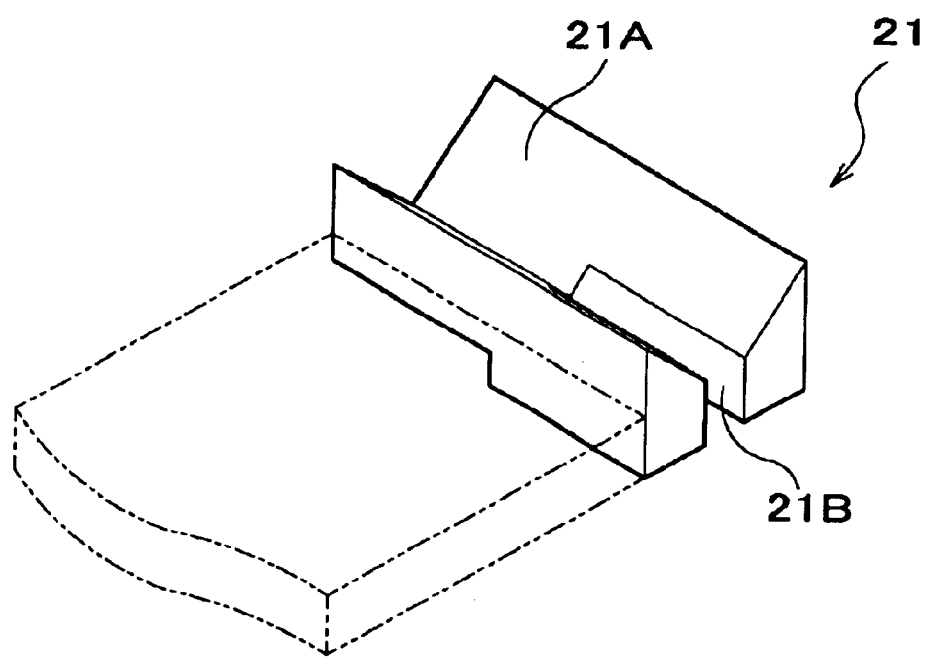
FIG. 18 is an enlarged perspective view of a guide member in the assembly supportive device as shown in FIG. 17.

The guide member 21, as shown in FIG. 18, includes a V-shaped groove 21A having an opening upward, and a slit 21B so provided as to cut through a bottom of the V-shaped groove 21A partway from one end thereof. The width of the slit 21B is so designed as to allow the spring support rod 36B of the slide door 36 around which the compression coil spring 37 is wound to pass through.

Next, a description will be given of an operation of fitting the slide door 36 into the lower half 1A shown in FIG. 12 using the assembly supportive device 20 for a magnetic tape cartridge according to the fourth embodiment of the present invention. First, prior to the operation of fitting the slide door 36, all internal components except the slide door 36 and the compression coil spring 37 are mounted each in a predetermined location in the lower half 1A. The internal components include a reel 2, a lock plate 3, a compression coil spring (reel spring) 4, a safety lug 8, a cartridge memory chip 9, and the like. The compression coil spring 37 is wound up around the spring support rod 36B of the slide door 36 in advance, and secured so as not to come off using the stopper head 36C. The assembly operation may be performed manually, but a dedicated assembly device (not shown) or a general-purpose assembly robot may be used, as well.

Figure 19:
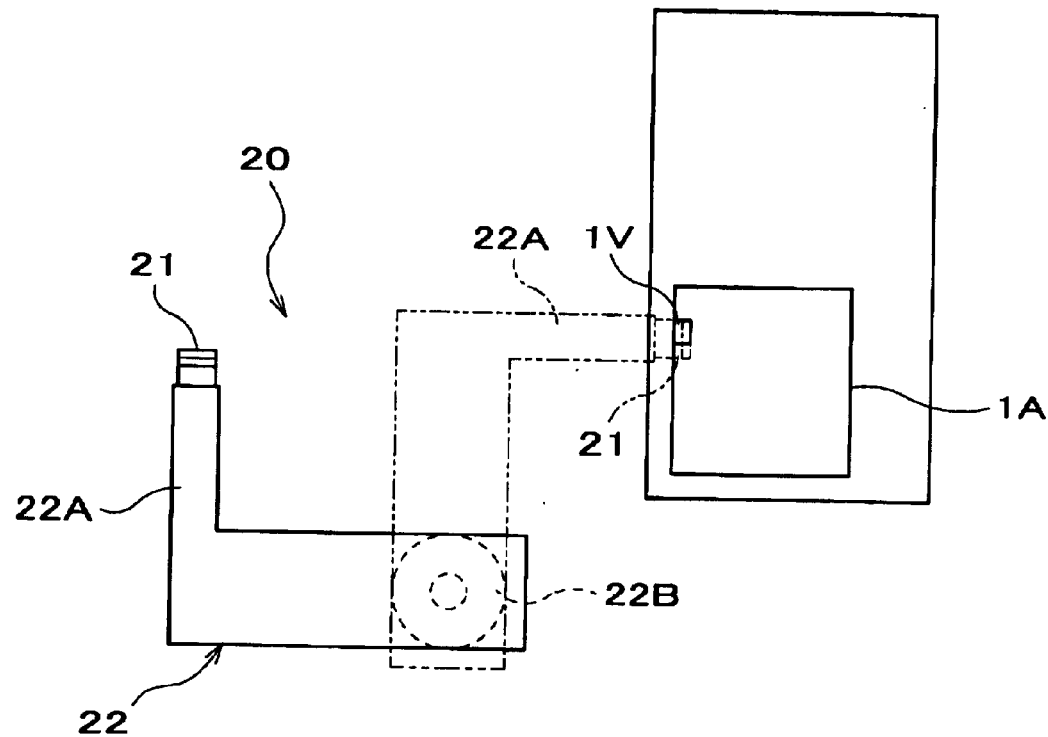
FIG. 19 is a plan view for explaining an operation of the assembly supportive device as shown in FIG. 17.
Figure 20:
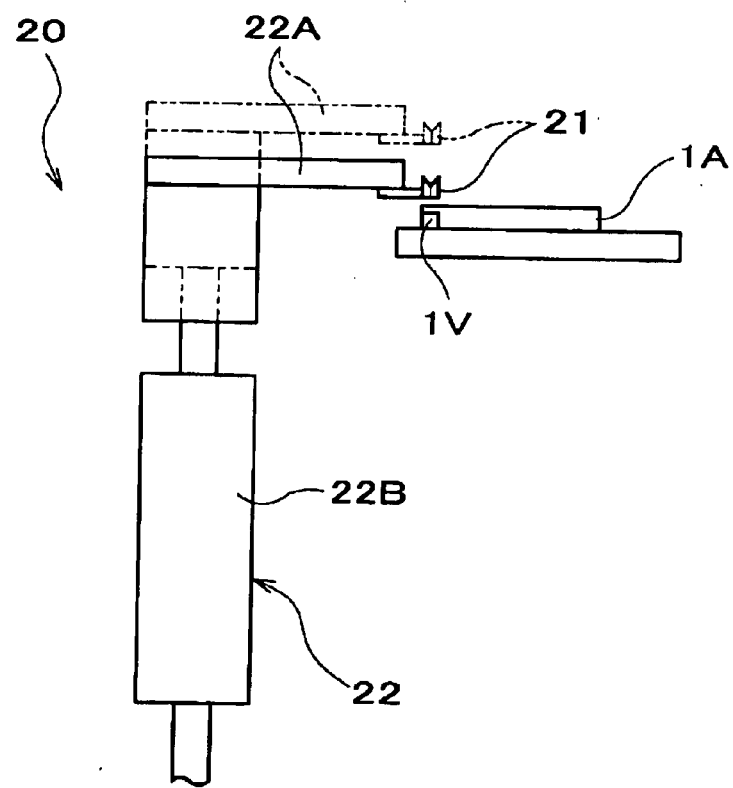
FIG. 20 is a side view for explaining an operation of the assembly supportive device as shown in FIG. 17.

When the slide door 36 is mounted in the lower half 1A, the assembly supportive device 20 allows the pivot arm 22A of the positioning device 22 to pivot so as to move the guide member 21 from a retraction position outside the lower half 1A indicated by solid lines to a position indicated by dash-double dot lines, as shown in FIG. 19. Next, as indicated by a solid line in FIG. 20, the pivot arm 22A is lowered to move and position the guide member 21 to a use position over the support rod receiving block 1V on the lower half 1A.

The slide door 36 is held in such a slightly tilted posture that the spring support rod 36B of the slide door 36 may orient obliquely in a gently declining direction, as shown in FIG. 21A. The distal end of the spring support rod 36B including the stopper head 36C is then pushed into a back end (the other end) of the V-shaped groove 21A of the guide member 21, and moves back to a front end (one end) from which a slit 21B is provided partway toward the other end, as shown in FIG. 21B. Through a series of these operations, the guide member 21 guides the distal end of the spring support rod 36B of the slide door 36 to the bottom of the V-shaped groove 21A, as indicated by dash-double dot lines in FIG. 21C, and thereafter through the slit 21B onto the support rod receiving groove 1V1 on the support rod receiving block 1V. The stopper head 36C provided on the distal end of the spring support rod 36B is moved along the support rod receiving groove 1V1 on the support rod receiving block 1V toward the spring receiving piece 1V2.

In the present embodiment as described above, even if the spring support rod 36B of the slide door 36 is slightly bent or incorrectly positioned, and thus the stopper head 36C at the distal end thereof is not properly aligned, the guide member 21 may securely guide the distal end of the spring support rod 36B including the stopper head 36C into the support rod receiving groove 1V1 on the support rod receiving block 1V in the lower half 1A, by using the V-shaped groove 21A. Accordingly, even if the series of operations as above are performed by an assembly robot, the distal end of the spring support rod 36B including the stopper head 36C in the slide door 36 may be securely guided into the support rod receiving groove 1V1 on the support rod receiving block 1V in the lower half 1A.

Figure 22A:
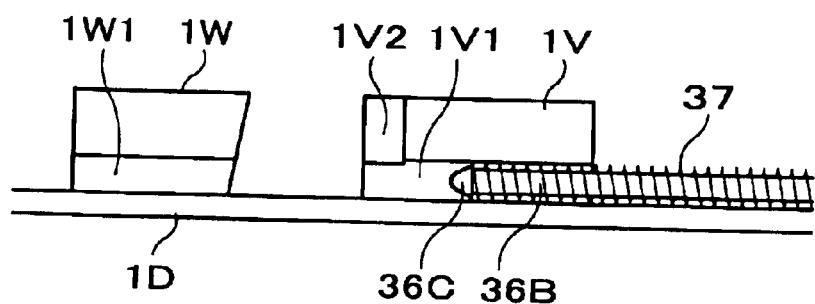
FIGS. 22(A) and (B) are diagrams for illustrating a state of entry of the spring support rod as shown in FIG. 21 into a support rod guide groove.
Figure 22B:
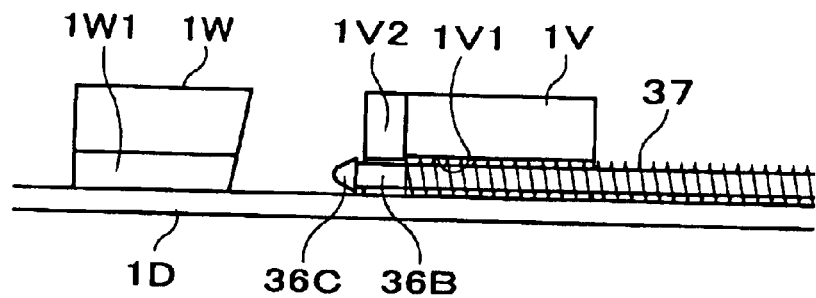
Figure 23A:
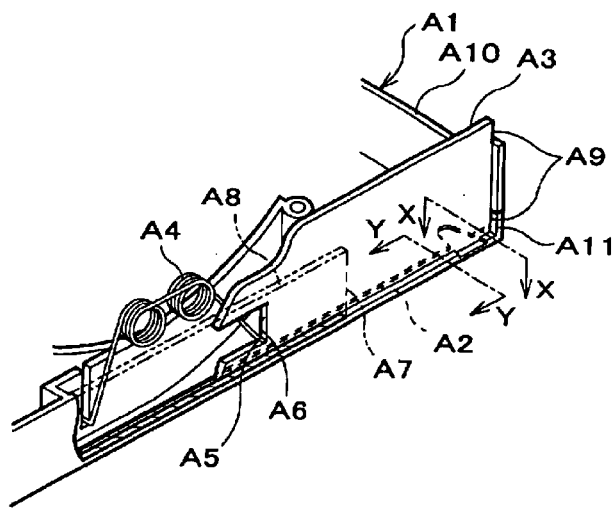
FIG. 23A is a partially magnified perspective view of a conventional magnetic tape cartridge with a portion near an opening thereof described.
Figure 23B:
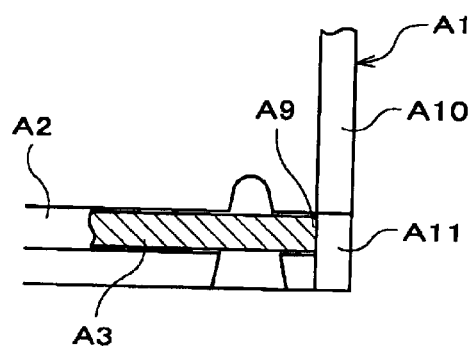
FIG. 23B is a cross-sectional view taken along line X—X in FIG. 23A for explaining a state in which a lower half of the magnetic tape cartridge and a slide door are kept in contact with each other.
Figure 23C:
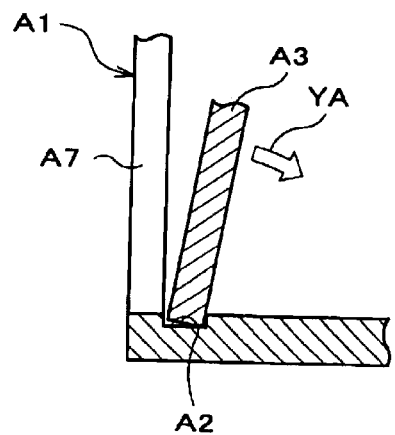
FIG. 23C is a cross-sectional view taken along line Y—Y in FIG. 23A for explaining a state in which the slide door is falling.
Figure 24:
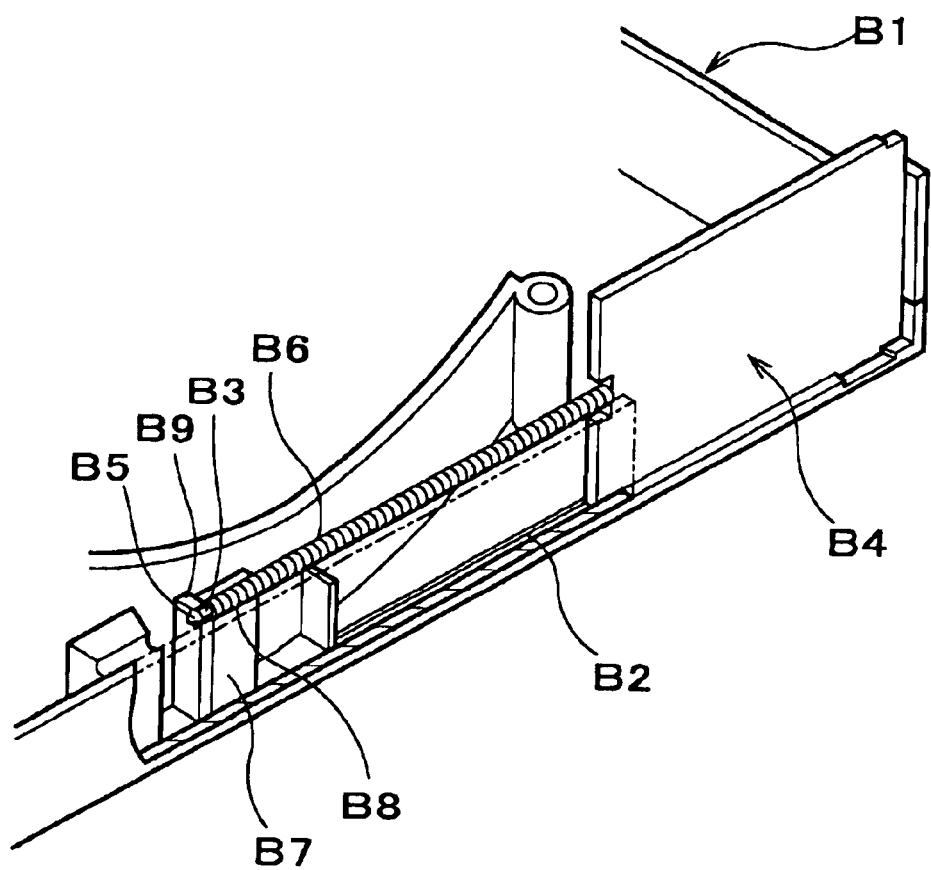
FIG. 24 is a diagram of a spring support rod of a slide door entering into a guide groove of the support rod during assembly operation of a conventional magnetic tape cartridge.

Next, the positioning device 22 of the assembly supportive device 20 pivots the pivot arm 22A, and moves the guide member 21 to the retraction position outside the lower half 1A. Subsequently, as shown in FIG. 22A, the spring support rod 36B of the slide door 36 is further moved along the support rod receiving groove 1V1 of the support rod receiving block 1V toward the spring receiving piece 1V2, and, as shown in FIG. 22B, the stopper head 36C is allowed to pass on a side of the spring receiving piece 1V2. Then, as shown in FIG. 13, the slide door 36 is lowered toward the guide groove 1G of the lower half 1A with a posture of the slide door 36 gradually restored to a horizontal and upright position, and the lower edge of the slide door 36 is fitted into the guide groove 1G.

Thereafter, the slide door 36 is moved slightly along the guide groove 1G toward a direction to close the opening 1C (to the right in FIG. 13), so that the front end thereof is brought into contact with the stopper portion 1M of the lower half 1A, and the slide door 36 is released. Lastly, the upper half 1B is combined with the lower half 1A. The above-described operations are continuously performed manually, or using a dedicated assembly device or an assembly robot.

Although the preferred embodiments of the present invention have been described above, various modifications and changes may be made in the present invention without departing from the spirit and scope thereof.

As described above, in the magnetic tape cartridge according to the present invention, the slide door stressed by the action of the spring member so as to keep the opening through which magnetic tape is drawn out closed has the front end thereof held in the holding concave portion provided at the sidewall. Therefore, the slide door supported by the holding concave portion is prevented from falling in a direction perpendicular to the face of the slide door. Consequently, the magnetic tape cartridge according to the present invention may be smoothly assembled.

What is claimed is:

1. A magnetic tape cartridge comprising:
   a first opening through which a magnetic tape is drawn out, the first opening being provided in part of a sidewall of a cartridge case across a lower half and an upper half of the cartridge case;
   a slide door that slides along the sidewall provided with the first opening to open and close the first opening;
   an extension arm formed substantially in a middle section of a front end portion of the slide door; and
   a second opening formed substantially in a middle section of an end portion of the sidewall for receiving the extension arm when the first opening is closed,
   wherein at least one of a lower half portion and an upper half portion of the end portion of the sidewall, which is respectively below and above the second opening, is provided with a holding concave portion that receives at least one of a lower section and an upper section of the front end portion of the slide door when the first opening is closed,
   wherein the holding concave portion is recessed within the end portion of the sidewall, and
   wherein the cartridge case contains a lower guide groove for accommodating a lower portion of the slide door for sliding the slide door to open and close the first opening, the lower guide groove extending to and abutting the sidewall.

2. A magnetic tape cartridge comprising:
   a first opening through which a magnetic tape is drawn out, the first opening being provided in part of a sidewall of a cartridge case across a lower half and an upper half of the cartridge case;
   a side door that slides along the sidewall provided with the first opening to open and close the first opening;
   an extension arm formed substantially in a middle section of a front end portion of the slide door; and
   a second opening formed substantially in a middle section of an end portion of the sidewall for receiving the extension arm when the first opening is closed,
   wherein at least one of a lower half portion and an upper half portion of the end portion of the sidewall, which is respectively below and above the second opening, is provided with a hole portion that receives a projection formed on the front end portion of the slide door when the first opening is closed.

3. A magnetic tape cartridge comprising:
   an opening through which a magnetic tape is drawn out, the opening being provided in part of a sidewall of a cartridge case across a lower half and an upper half of the cartridge case; and
   a slid door that slides along the sidewall provided with the opening to open and close the opening,
   wherein, recessed within at least one of a lower half portion and an upper half portion of the sidewall, is provided means for preventing the slide door from falling in a direction towards an inside of the cartridge case and a direction towards the outside of the cartridge case, when the opening is closed, wherein the cartridge case contains a lower guide groove for accommodating a lower portion of the slide door for sliding the slide door to open and close the opening, the lower guide groove extending to and abutting the sidewall.

4. The magnetic tape cartridge according to claim 1, wherein the holding concave portion has a substantially rectangular cross-section.

5. The magnetic tape cartridge according to claim 1, wherein the holding concave portion has a substantially U-shaped cross-section.

6. The magnetic tape cartridge according to claim 1, wherein the holding concave portion has a substantially V-shaped cross-section.

7. A magnetic tape cartridge comprising:

an opening through which a magnetic tape is drawn out, the opening being provided in part of a sidewall of a cartridge case across a lower half and an upper half of the cartridge case; and a slide door that slides along the sidewall provided with the opening to open and close the opening, wherein at least one of a lower half portion and an upper half portion of the sidewall is provided with a holding concave portion that holds a front end portion of the slide door from both sides thereof when the opening is closed, wherein the holding concave portion is recessed within the sidewall, wherein the cartridge case contains a lower guide groove for accommodating a lower portion of the slide door for sliding the slide door to open and close the opening, the lower guide grove extending to and abutting the sidewall.

* * * * *